(12) United States Patent
Tetsukawa et al.

(10) Patent No.: US 6,989,974 B2
(45) Date of Patent: Jan. 24, 2006

(54) MAGNETIC RECORDING/REPRODUCING APPARATUS USING A GMR HEAD

(75) Inventors: Hiroki Tetsukawa, Kanagawa (JP); Yutaka Soda, Kanagawa (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 10/735,090

(22) Filed: Dec. 12, 2003

(65) Prior Publication Data

US 2004/0184198 A1    Sep. 23, 2004

(30) Foreign Application Priority Data

Dec. 20, 2002  (JP)  ............................. P2002-370518
Apr. 16, 2003  (JP)  ............................. P2003-111614

(51) Int. Cl.
    *G11B 5/39*    (2006.01)
(52) U.S. Cl. .................................................. 360/324.1
(58) Field of Classification Search . 360/324.1–324.12
    See application file for complete search history.

(56) References Cited

U.S. PATENT DOCUMENTS 5,766,743 A * 6/1998 Fujikata et al. ............. 428/212
6,764,778 B2 * 7/2004 Saito et al. ............... 428/811.2

* cited by examiner

*Primary Examiner*—A. J. Heinz
(74) *Attorney, Agent, or Firm*—Sonnenschein, Nath & Rosenthal LLP

(57) ABSTRACT

A highly reliable magnetic recording/reproducing apparatus is provided. In the magnetic recording/reproducing apparatus, a spin-valve film is used as a magnetic sensor element for detecting magnetic signals. By defining the corrosion potential of this spin-valve film, and further by specifying the residual magnetization of a magnetic recording medium used as well as the product of the residual magnetization and the thickness of the magnetic layer to a range that is numerically optimal, the occurrence of corrosion on the surface of a magnetoresistive head that contacts the medium is prevented, and the occurrence of electromagnetic discharge is avoided. Further, by numerically specifying the surface resistivity of the metal magnetic thin film of the magnetic recording medium, as well as the roughness of the surface on which the metal magnetic thin film is formed, electrostatic discharge preventing effects and wear resistance are improved.

9 Claims, 14 Drawing Sheets

MAGNETIC RECORDING/REPRODUCING APPARATUS USING A GMR HEAD

CROSS REFERENCE TO RELATED APPLICATIONS

The present document claims priority to Japanese Priority Document JP 2002-370518, filed in the Japanese Patent Office on Dec. 20, 2002, and on Japanese Priority Document JP 2003-111614, filed in the Japanese Patent Office on Apr. 16, 2003, the entire contents of which are incorporated herein by reference to the extent permitted by law.

BACKGROUND OF THE INVENTION

1. Field of the Invention

The present invention relates to a magnetic recording/reproducing apparatus that is equipped with a magnetoresistive head that uses a spin-valve film as a magnetic sensor element for detecting magnetic signals while in contact with a magnetic recording medium.

2. Description of the Related Art

As magnetic sensor elements that detect the magnetic fields of signals from a magnetic recording medium, magnetoresistive elements (hereinafter referred to as MR elements) that utilize magnetoresistive effects where the resistance changes depending on the magnitude and direction of an external magnetic field are used. A magnetic head equipped with such an MR element is generally called a magnetoresistive head (hereinafter referred to as MR head).

As such an MR element, one in which anisotropic magnetoresistive effects are utilized has been in use conventionally, but because its magnetoresistance ratio (MR ratio) is small, an MR element which exhibits a greater MR ratio is desired, and in recent years, giant magnetoresistive elements (hereinafter referred to as GMR elements) that utilize spin-valve films have been proposed (see, for example, non-patent document 1 or patent document 1 mentioned below).

A GMR element has a spin-valve film in which a non-magnetic layer is held by and between a pair of magnetic layers, and utilizes so-called giant magnetoresistive effects where the conductance of a sense current flowing in-plane with respect to the spin-valve film changes depending on the relative angle of magnetization between the pair of magnetic layers.

Specifically, the spin-valve film has a structure in which an anti-ferromagnetic layer, a pinned layer whose direction of magnetization is pinned in a predetermined direction by an exchange-coupling field at work between itself and the anti-ferromagnetic layer, a free layer whose magnetization direction changes depending on an external magnetic field, and a non-magnetic layer for magnetically isolating the pinned layer and the free layer are stacked.

In a GMR element using a spin-valve film, when an external magnetic field is applied, the magnetization direction of the free layer changes depending on the magnitude and direction of the external magnetic field. When the magnetization direction of the free layer is opposite (anti-parallel) the magnetization direction of the pinned layer, resistance to the sense current flowing through the spin-valve film becomes greatest. On the other hand, when the magnetization direction of the free layer and the magnetization direction of the pinned layer are the same (parallel), resistance to the sense current flowing through the spin-valve film becomes smallest.

Therefore, in a magnetic head equipped with such a GMR element (hereinafter referred to as a GMR head), when a constant sense current is supplied to the GMR element, the voltage of the sense current flowing through the GMR element changes depending on the magnetic field of signals from a magnetic recording medium, and magnetic signals can be read from the magnetic recording medium by detecting the change in the voltage of the sense current.

In non-patent document 1, an example in which a GMR head is used in a hard disk drive is disclosed.

A hard disk drive has a structure in which, for example, a GMR head is mounted on a head slider attached to the tip of a suspension. The airflow that is generated by the rotation of the magnetic disk makes the head slider float above the signal recording surface of the magnetic disk, and reading operations with respect to the magnetic disk are performed by having magnetic signals that are recorded on the magnetic disk read by the GMR head mounted on the head slider.

Applications of the GMR head above are not limited to magnetic disk apparatuses, and in recent years, applications in magnetic tape apparatuses such as tape streamers and the like are being considered.

For example, a tape streamer that adopts a helical scan system has a structure in which a GMR head is positioned on the outer circumferential surface of a rotary drum such that it is oblique in accordance with the azimuth angle with respect to the direction that is substantially orthogonal to the running direction of the magnetic tape.

In the tape streamer, the magnetic tape runs obliquely with respect to the rotary drum, the rotary drum rotates, and reading operations for the magnetic tape are performed by reading the magnetic signals recorded on the magnetic tape while the GMR head mounted on the rotary drum and the magnetic tape slide in contact with each other.

In the tape streamer, because it is preferable that the distance between the GMR head and the magnetic tape, otherwise known as spacing, be kept small, in this respect, it is desirable that the surface of the magnetic tape be calendered.

However, as the surface of the magnetic tape becomes smoother, the contact area between the magnetic tape and the outer peripheral circumferential surface of the rotary drum increases, and the friction between the magnetic tape and the rotary drum while the tape is running becomes greater, thereby causing the magnetic tape and the rotary drum to stick, and it becomes difficult for the magnetic tape to run smoothly.

Therefore, the contact area with the outer circumferential portion of the rotary drum is made smaller, and the friction between the magnetic tape and the rotary drum smaller, by providing small protrusions on the surface of the magnetic tape using $SiO_2$ fillers, organic fillers and the like.

In addition, a protective film, such as a DLC (diamond-like carbon) film or the like, for preventing damage or corrosion is formed on the surface of the magnetic tape.

In the conventional hard disk drive described above, reading operations are performed under conditions in which the GMR head is not in contact with the signal recording surface of the magnetic disk. In addition, Cu is ordinarily used for the non-magnetic layer of the spin-valve film, and on the surface of the GMR head that faces the magnetic disk is formed a protective film, such as a DLC film or the like, for preventing Cu from becoming corroded.

On the other hand, as for the magnetic recording tape medium, so-called coated type magnetic recording media have been widely used. To make this type of magnetic recording medium, powder magnetic material such as oxide magnetic powder or alloy magnetic powder is dispersed in an organic binder such as vinyl chloride-vinyl acetate copolymer, polyester resin, polyurethane resin etc., and a magnetic coating material thus prepared is coated on a non-magnetic substrate and is dried.

In contrast, with the increasing demand for high-density recording, a magnetic recording medium of the so-called metal magnetic thin film type has been proposed and is drawing attention. To make this type of magnetic recording medium, a metal magnetic material such as Co—Ni, Co—Cr, Co, etc. is directly deposited on a non-magnetic substrate by plating or by vacuum thin film forming means (such as vacuum deposition, sputtering, ion plating and the like)

The magnetic recording medium of the metal magnetic thin film type is superior in terms of coercivity, residual magnetization, and squareness ratio. It has superior electromagnetic conversion characteristics at short wavelengths, and the thickness of the magnetic layer can be made very thin. As a result, it is advantageous in that thickness loss at reproduction and recording demagnetization are low. There is no need to use a binder, which is a non-magnetic material, into the magnetic layer, and the filling density of the magnetic material can be increased and higher magnetization can be attained.

Further, in order to improve the electromagnetic conversion characteristics of such magnetic recording media and attain higher output, so-called oblique vacuum deposition has been proposed where the magnetic layer is obliquely deposited in forming the magnetic layer of the magnetic recording medium. The magnetic recording medium of this type has been put to practical use as a magnetic tape for high definition VTR or for digital VTR.

[Non-Patent Document 1]
"Giant Magnetoresistance in Soft Ferromagnetic Multi-layers" Physical Review B, Volume 43, Number 1, pages 1297~1300

[Patent Document 1]
Japanese Patent Application Publication Hei-8-111010

SUMMARY OF THE INVENTION

However, in tape streamers, for which the use of GMR heads is being considered currently, because reading operations are performed under conditions in which the GMR head and the magnetic tape are in contact, if a protective film for preventing corrosion, as mentioned above, is formed on the surface of the GMR head that is placed in sliding contact with the magnetic tape, the protective film wears during reading operations due to the contact between the small protrusions and the protective film formed on the surface of the magnetic tape.

Further, because the protective film formed on the surface of the GMR head that contacts the medium creates a space between the magnetic tape, it causes degradation in the short wavelength recording/reproducing characteristics of the GMR head.

Therefore, in magnetic tape apparatuses, it can be considered inappropriate to form a protective film on the surface of the GMR head that contacts the recording medium.

For this reason, in magnetic tape apparatuses, the surface of the GMR head that contacts the recording medium is in direct contact with the atmosphere, and there is a problem in that when used under harsh conditions such as high temperature and humidity conditions, seawater atmosphere or the like, corrosion is more likely to occur.

The sensitivity of the GMR head is determined by the sense current flowing through the spin-valve film. Each layer constituting this spin-valve film is formed with a thickness on the order of several nanometers, and even with the slightest corrosion, the electrical resistance of each layer changes. Therefore, the occurrence of corrosion in the GMR head on its surface that contacts the recording medium causes a significant degradation in the head characteristics of the GMR head.

In patent document 1 mentioned above, considerations for improving the corrosion resistance of magnetoresistive heads used in hard disks are given, however, because in hard disk apparatuses the magnetic head does not directly contact the recording medium, it should be obvious that the amount of damage is greater in tape systems due to friction with the magnetic head.

Further, in hard disk apparatuses, because the medium is sealed airtight through packaging, and is thus not exposed to the external atmosphere, damage to the magnetic head due to fine dust and the like are again considered more severe in tape systems. Therefore, achieving an improvement in the corrosion resistance of GMR heads used in magnetic tape apparatuses is even more important than it is for hard disk drives.

In view of the problems above, it is necessary that corrosion resistance be improved and a high magnetoresistance ratio be maintained especially when a GMR element is used as a magnetic sensor element for detecting magnetic signals while in contact with a magnetic recording medium.

In addition, as for the magnetic recording medium to be used with such a magnetoresistive head having high sensitivity, when a magnetic recording medium that is designed for use with the conventionally known inductive magnetic head is used with a high sensitivity magnetic head, medium noise becomes greater, and because the residual magnetization is large, the magnetic head saturates.

In addition, when a magnetic recording medium that is designed for use with the conventionally known inductive magnetic head is used with a high sensitivity magnetic head, there is a risk that the surface of the magnetoresistive head would become worn from the $SiO_2$ filler, organic filler or the like provided on the surface of the magnetic recording medium.

Since the inductive head detects signals from the amount of change in the magnetic flux from the magnetic recording medium, some amount of head wear is acceptable. However, because the magnetoresistive head detects the change in resistance of the magnetic sensor element, even head wear on the order of nm causes the operating point of the magnetoresistive head to change, and the detected signals are changed.

Thus, the present invention provides a magnetic recording/reproducing apparatus equipped with a magnetoresistive head that has superior corrosion resistance and high sensitivity.

A magnetic recording/reproducing apparatus related to the present invention is comprised of a magnetoresistive head including a spin-valve film as a magnetic sensor element for detecting magnetic signals, the spin-valve film having a structure in which an anti-ferromagnetic layer, a pinned layer in which the direction of magnetization is pinned in a predetermined direction by an exchange-coupling magnetic field at work between itself and the anti-ferromagnetic layer, a free layer in which the direction of magnetization changes in accordance with an external magnetic field, and a non-magnetic layer for magnetically isolating the pinned layer and the free layer are layered. In the magnetic recording/reproducing apparatus, magnetic signals are detected from a magnetic recording medium, which includes a tape-shaped non-magnetic substrate and a metal magnetic thin film formed thereon, while in sliding contact. The spin-valve film has a corrosion potential relative to a standard hydrogen electrode of +0.4. [V vs. SHE] or greater when immersed in a NaCl solution of a concentration of 0.1 mol/L. The product Mr·t of residual magnetization Mr and thickness t of the metal magnetic thin film is 4 mA to 20 mA, and the residual magnetization Mr is 160 kA/m to 400 kA/m.

The metal magnetic thin film of a magnetic recording medium that is used with a magnetic recording/reproducing apparatus related to the present invention may have a surface resistivity of $1 \times 10^3$ Ω/sq. to $1 \times 10^9$ Ω/sq.

In addition, the metal magnetic thin film of a magnetic recording medium that is used with a magnetic recording/reproducing apparatus related to the present invention may have an arithmetic mean roughness Ra of 1 nm to 5 nm and a ten-point mean roughness Rz of 20 nm to 200 nm.

According to the magnetic recording/reproducing apparatus above, by numerically restricting the corrosion potential of the spin-valve film of the magnetoresistive head, even if no protective layer is formed on the surface that contacts the recording medium, favorable corrosion resistance and durability can be attained. In addition, by numerically restricting the residual magnetization, as well as the product of the residual magnetization of the magnetic recording medium and the thickness of the magnetic layer, noise can be reduced, magnetic head saturation can be prevented effectively, distortion in the reproduced waveform is eliminated, and the S/N ratio can be improved.

In addition, by restricting the surface resistivity of the metal magnetic thin film of the magnetic recording medium to a numerically optimal range, electrostatic discharge of the magnetic head can be prevented effectively, noise can be reduced, distortion in the reproduced waveform can be eliminated, and the S/N ratio can be improved.

In addition, by restricting the arithmetic mean roughness Ra and the ten-point mean roughness Rz of the metal magnetic thin film of the magnetic recording medium to a numerically optimal range, wear of the magnetoresistive head can be suppressed, and the durability of the high sensitivity magnetic head can be improved.

DESCRIPTION OF THE PREFERRED EMBODIMENTS

Hereinafter, embodiments of a magnetic recording/reproducing apparatus according to the present invention will be described in detail with reference to the drawings.

Figure 1:
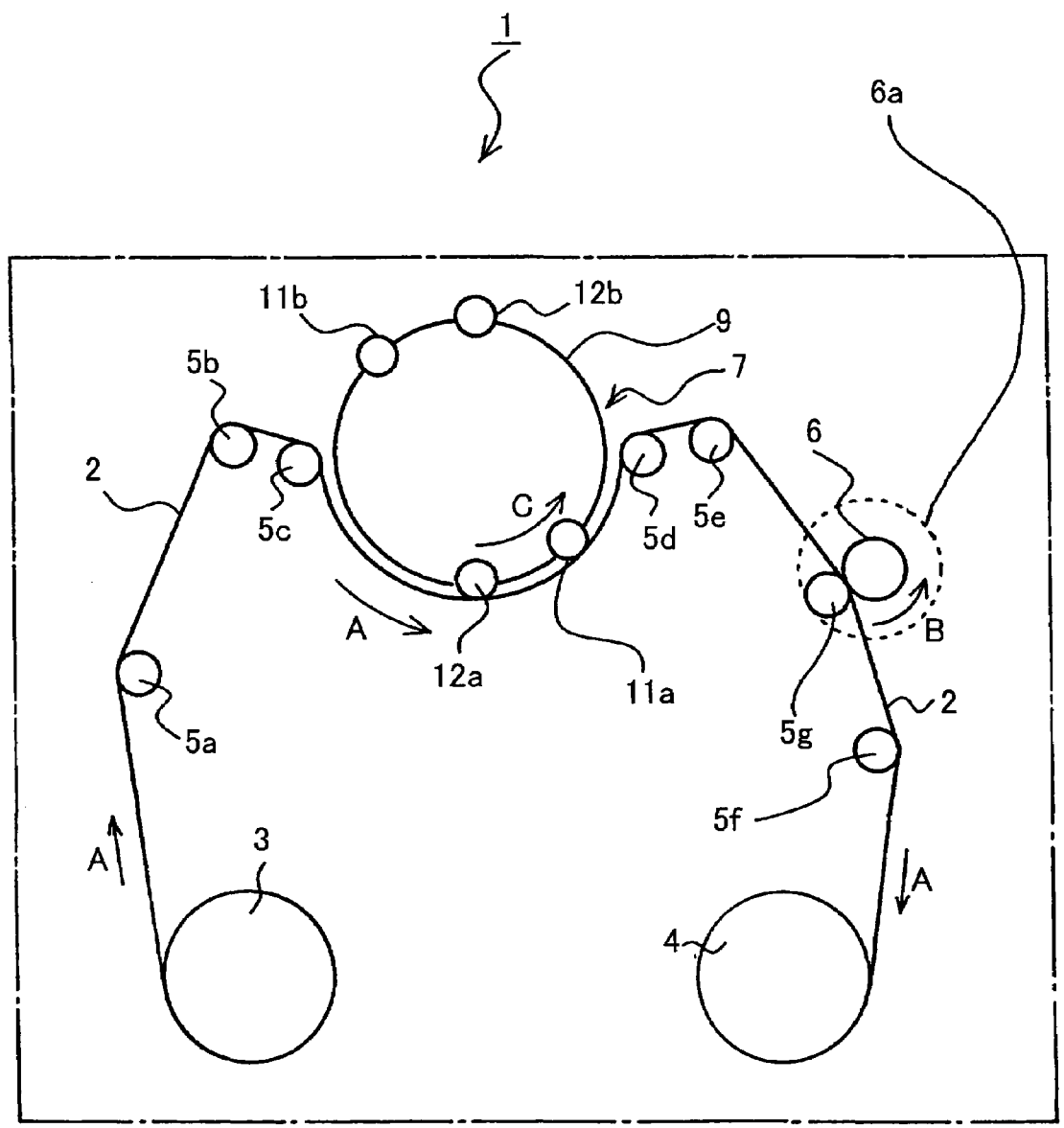
FIG. 1 is a schematic plan view of a recording/reproducing apparatus for magnetic tapes.

The magnetic recording/reproducing apparatus 1 shown in FIG. 1 records and/or reads signals to and from a magnetic tape 2 by the helical scan method.

The magnetic recording/reproducing apparatus 1 is provided with a tape supply reel 3 for supplying the magnetic tape 2, a take-up reel 4 for winding the magnetic tape supplied from the supply reel 3, and a plurality of guide rollers 5a to 5f for guiding the magnetic tape 2 between the supply reel 3 and the take-up reel 4. The magnetic tape 2 runs in the direction indicated by arrows A in FIG. 1.

Further, between guide rollers 5e and 5f, there are provided, as tape running means, a pinch roller 5g that contacts the magnetic tape 2, a capstan 6 which pinches the magnetic tape 2 together with the pinch roller 5g, and a capstan motor 6a for rotating the capstan 6.

The magnetic tape 2, which is pinched between the pinch roller 5g and the capstan 6 that is rotated by the capstan motor 6a in the direction indicated by arrow B, runs in the direction indicated by arrows A at and with a constant speed and tension.

In the magnetic recording/reproducing apparatus 1, a head drum 7 for performing recording operations or reading operations with respect to the magnetic tape 2 is provided between the guide rollers 5c and 5d.

Figure 2:
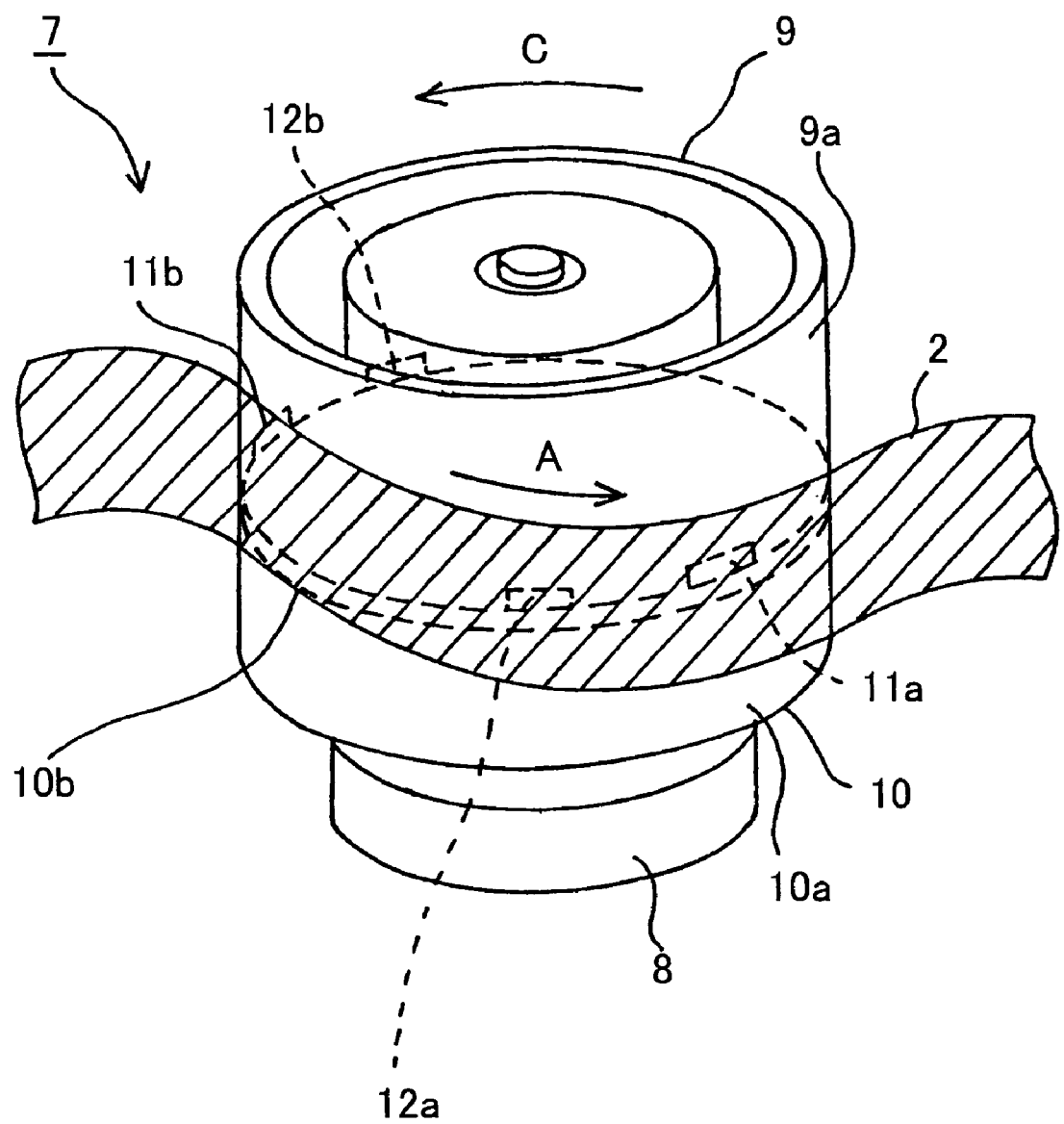
FIG. 2 is a schematic perspective view of a head drum for a recording/reproducing apparatus.

As shown in FIG. 2, the head drum 7 has a rotary drum 9, which is rotated by a drive motor 8 in the direction indicated by arrow A, and a stationary drum 10 fixed on a base (not shown). An outer circumferential surface 9a of the rotary drum 9 and an outer circumferential surface 10a of the stationary drum 10 are continuous.

The magnetic tape 2 is guided by the guide rollers shown in FIG. 1, and runs in a state where it is helically wound around the outer circumferential surfaces 9a and 10a of the rotary drum 9 and the stationary drum 10 with an angular range of approximately 180 degrees.

Further, on the outer circumferential surface 10a of the stationary drum 10, there is provided a lead guide 10b for guiding the magnetic tape 2, thereby causing the magnetic tape 2 to run obliquely relative to the direction of rotation of the rotary drum 9.

On the outer circumferential surface 9a of the rotary drum 9, there are mounted a pair of recording magnetic heads 11a and 11b for performing signal recording operations on the magnetic tape 2, and a pair of reproducing magnetic heads 12a and 12b for performing signal reproduction operations on the magnetic tape 2.

The recording magnetic head 11a and the recording magnetic head 11b have a 180-degree phase difference, and the reproducing magnetic head 12a and the reproducing magnetic head 12b similarly have a 180-degree phase difference. In other words, they are disposed on opposite sides of the outer circumferential surface 9a of the rotary drum 9.

Further, the pair of recording magnetic heads 11a and 11b and the pair of reproducing magnetic heads 12a and 12b are disposed in such a manner that their recording gap and their reproducing gap become oblique in accordance with the azimuth angle with respect to the direction that is substantially orthogonal to the running direction of the magnetic tape 2.

Thus, in the head drum 7, a signal recording or reproducing operation is performed while the magnetic tape 2 contacts the pair of recording magnetic heads 11a and 11b and the pair of reproducing magnetic heads 12a and 12b by having the magnetic tape 2, which contacts both the outer circumferential surfaces 9a and 10a of the rotary drum 9 and the stationary drum 10, respectively, run in the direction of arrow A shown in FIG. 2, while the rotary drum 9 is rotated by the drive motor 8 in the direction of arrow C.

Specifically, at the time of recording, the recording magnetic head 11a forms on the magnetic tape 2 a recording track with a predetermined track width by applying a magnetic field in accordance with a recording signal, and the recording magnetic head 11b forms a recording track with a predetermined track width adjacent to the recording track mentioned above by applying a magnetic field in accordance with a recording signal.

Then, by repeatedly forming recording tracks on the magnetic tape 2 with the pair of recording magnetic heads 11a and 11b, signals are continuously recorded on the magnetic tape 2.

On the other hand, at the time of reproduction, the reproducing magnetic head 12a detects a magnetic field of a signal from a recorded track recorded on the magnetic tape 2 by the recording magnetic head 11a, while the reproducing magnetic head 12b detects the magnetic field of a signal from a recorded track recorded by the recording magnetic head 11b. By repeatedly detecting the magnetic field of signals from recorded tracks by means of these reproducing magnetic heads 12a and 12b, the signals recorded on the magnetic tape 2 are reproduced continuously.

Figure 3:
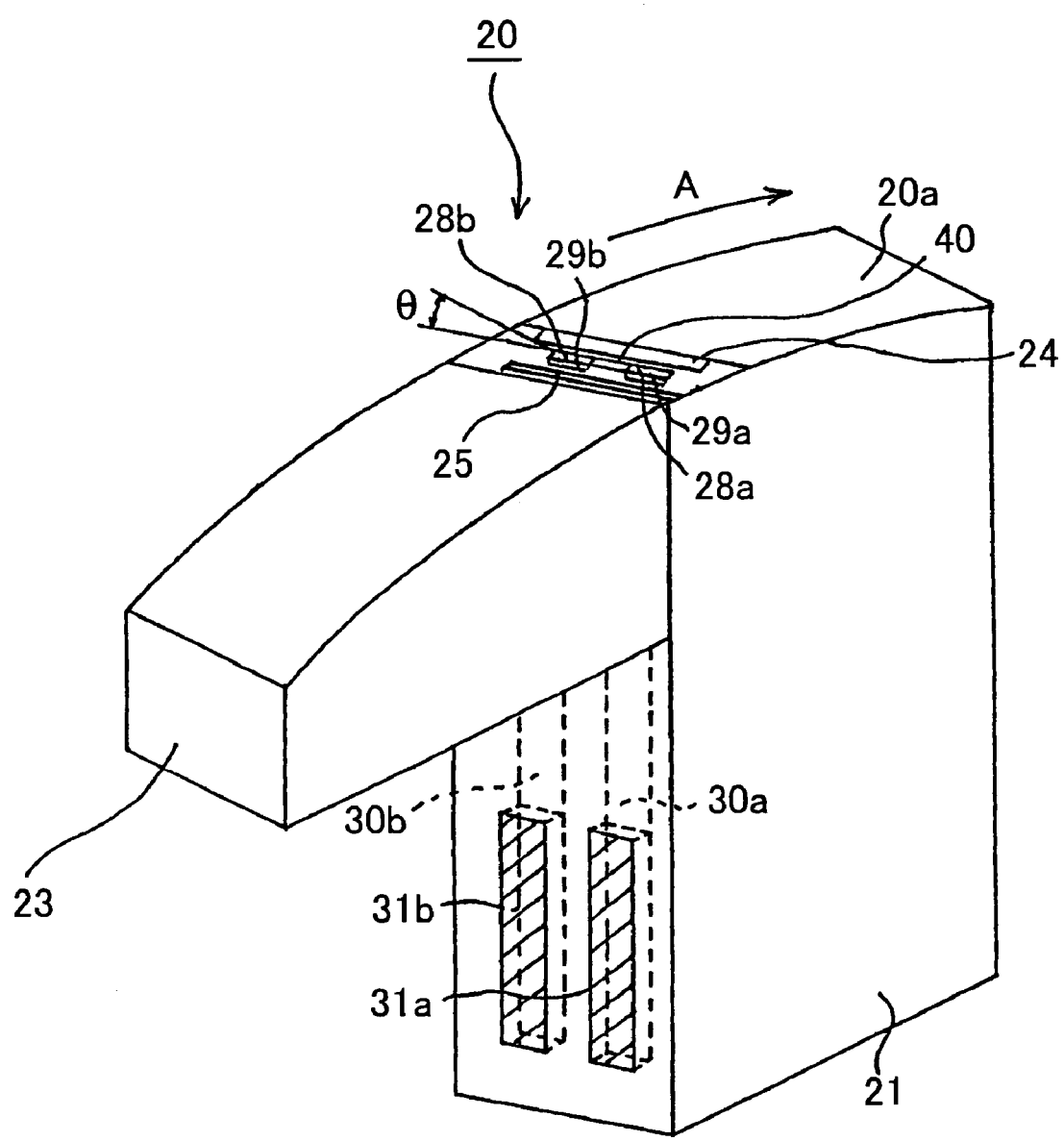
FIG. 3 is a schematic perspective view of a magnetoresistive head of an embodiment of the present invention.
Figure 4:
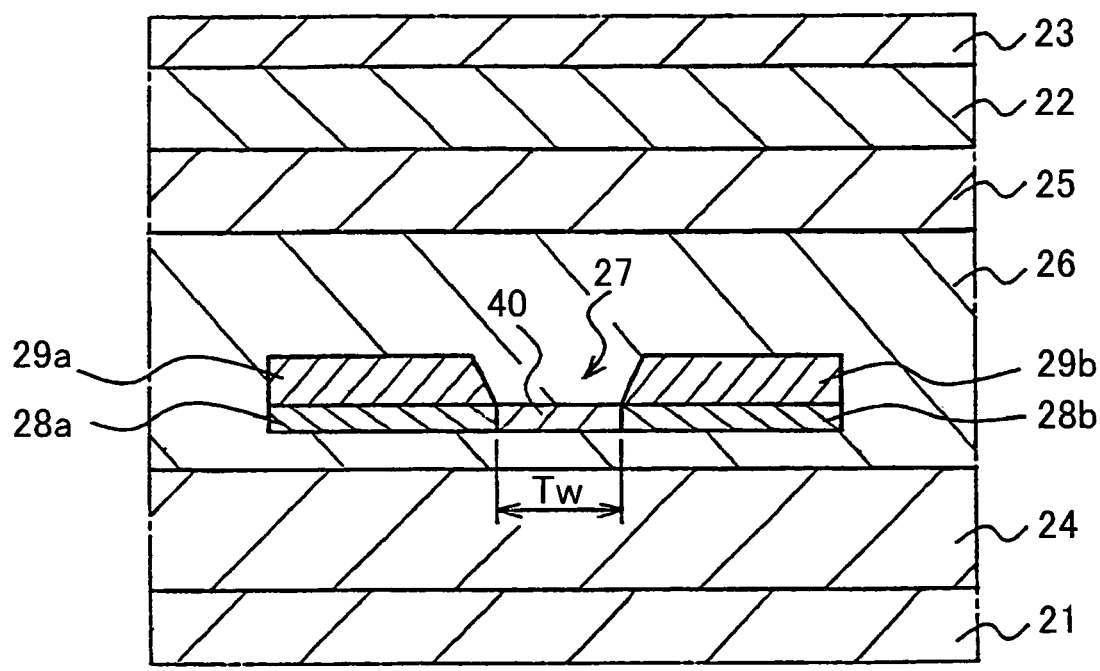
FIG. 4 is an end view of a GMR head as viewed from the medium sliding surface side.

FIG. 3 is a schematic perspective view of a magnetoresistive head related to an embodiment of the present invention, where a portion thereof is removed. FIG. 4 is a schematic configurational view of a surface of a magnetoresistive head that contacts a magnetic tape. With reference to FIGS. 3 and 4, a magnetoresistive head according to an embodiment of the present invention will be described in detail.

The magnetoresistive head 20 shown in FIG. 3 is a so-called giant magnetoresistive head (hereinafter referred to as a GMR head), which is provided with a giant magnetoresistive element (hereinafter referred to as a GMR element), which utilizes a spin-valve film, as a magnetic sensor element for detecting a magnetic signal from a magnetic recording medium.

This GMR head 20 is more sensitive and has a higher reproductive output than an inductive type magnetic head, which records/reproduces information utilizing electromagnetic induction or an anisotropic magnetoresistive head, and is suitable for high density recording. Therefore, in the magnetic recording/reproducing apparatus 1 described above, by using this GMR head 20 as the pair of reproducing magnetic heads 12a and 12b, recording of an even higher density can be achieved.

Specifically, the reproducing magnetic heads 12a and 12b have a structure, as shown in FIG. 4, in which a magnetic shield layer 24, a GMR element 27, a gap layer 26 and a shield layer 25 are sequentially formed on a first core member 21 through thin film forming techniques, such as plating, sputtering, vapor deposition or the like, and a second core member 23 is adhered with a protection film 22 in between.

Further, a medium sliding surface 20a of the reproducing magnetic heads 12a and 12b that contact the magnetic tape 2 has a curved surface curved in substantially a circular arc along the running direction of the magnetic tape 2 as indicated by arrow A in FIG. 3. A reproduction gap facing outward from the medium sliding surface 20a is disposed obliquely in accordance with the azimuth angle θ relative to a direction that is substantially orthogonal to the running direction of the magnetic tape 2.

The pair of reproducing magnetic heads 12a and 12b have a similar construction except that their azimuth angles θ are opposite in phase. Therefore, in the following description, the pair of reproducing magnetic heads 12a and 12b will be referred to collectively as the GMR head 20.

The GMR head 20 has a structure in which, as shown in FIG. 4, the GMR element 27 is placed between a pair of upper and lower magnetic shield layers 24 and 25 via a gap layer 26.

The pair of magnetic shield layers 24 and 25 are made of a soft magnetic film having a sufficient width to magnetically shield the GMR element 27, and by sandwiching the GMR element 27 therebetween via the gap layer 26, they function such that, of the magnetic fields of the signals from the magnetic tape 2, those that are not subject to reproduction are not drawn into the GMR element 27. In other words, in the GMR head 20, the magnetic fields of signals that are not subject to reproduction by the GMR element 27 are led to the pair of magnetic shield layers 24 and 25, and only the magnetic fields of signals that are subject to reproduction are led to the GMR element 27. Thus, the frequency characteristics and resolution of the GMR element 27 can be improved.

The gap layer 26 includes a non-magnetic non-conductive film, which magnetically isolates the GMR element 27 and the pair of magnetic shield layers 24 and 25. The space between the pair of magnetic shield layers 24 and 25 and the GMR element 27 becomes the gap length.

The GMR element 27 includes a spin-valve film 40, and utilizes so-called giant magnetoresistive effects where the conductance of a sense current flowing in-plane through the spin-valve film changes depending on the relative angle of magnetization between a pair of magnetic layers.

Figure 5A:
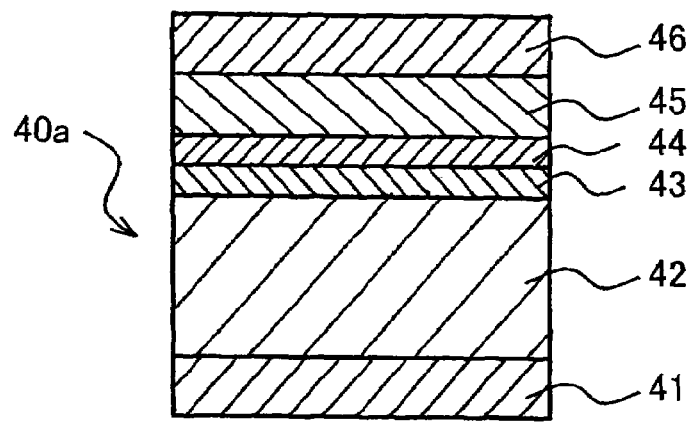
FIGS. 5A, 5B and 5C are schematic sectional views of spin-valve films of a bottom type, a top type and a dual type, respectively.
Figure 5B:
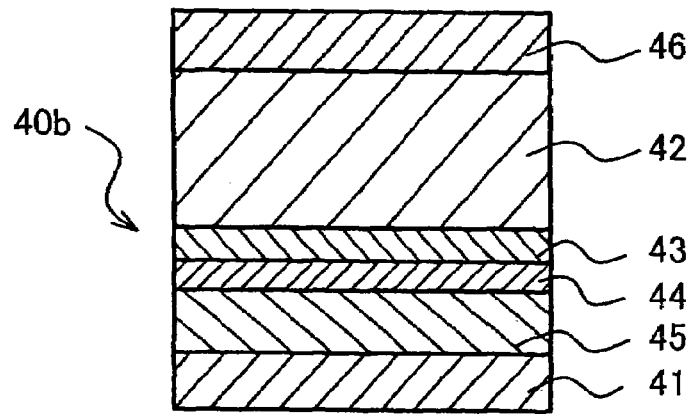
Figure 5C:
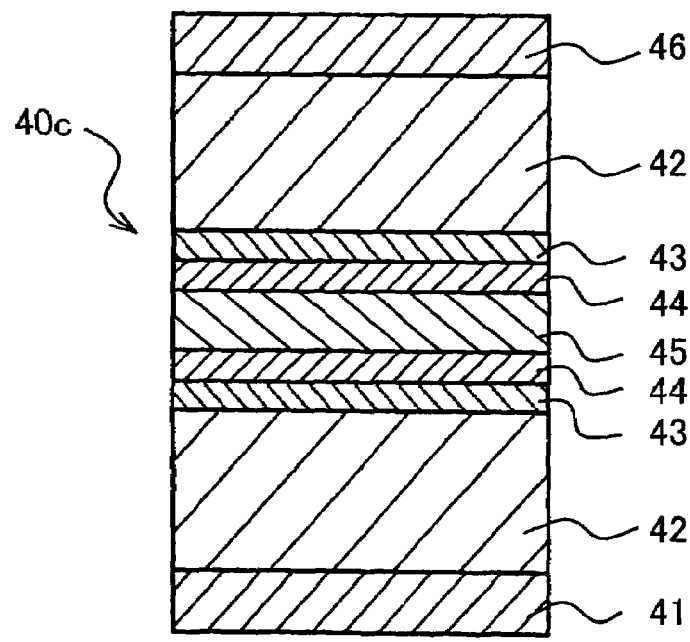

Examples of the spin-valve film 40 include, for example: a bottom type spin-valve film 40a having a structure in which, as shown in FIG. 5A, a foundation layer 41, an anti-ferromagnetic layer 42, a pinned layer 43, a non-magnetic layer 44, a free layer 45 and a protection layer 46 are sequentially layered; a top type spin-valve film 40b having a structure in which, as shown in FIG. 5B, a foundation layer 41, a free layer 45, a non-magnetic layer 44, a pinned layer 43, an anti-ferromagnetic layer 42 and a protection layer 46 are sequentially layered; and a dual type spin-valve film 40c having a structure in which, as shown in FIG. 5C, a foundation layer 41, an anti-ferromagnetic layer 42, a pinned layer 43, a non-magnetic layer 44, a free layer 45, a non-magnetic layer 44, a pinned layer 43, an anti-ferromagnetic layer 42 and a protection layer 46 are sequentially layered.

The pinned layer 43 forming part of the spin-valve film is disposed adjacent to the anti-ferromagnetic layer 42 so that its magnetization direction is pinned in a predetermined direction by an exchange-coupling magnetic field at work between the anti-ferromagnetic layer 42 and itself.

On the other hand, by being magnetically isolated from the pinned layer 43 via the non-magnetic layer 44, the free layer 45 can have its magnetization direction altered easily in response to a weak external magnetic field.

Therefore, in the spin-valve film 40, when an external magnetic field is applied, the magnetization direction of the free layer 45 changes in accordance with the magnitude and the direction of the external magnetic field. When the direction of magnetization of the free layer 45 is opposite (anti-parallel) to the direction of magnetization of the pinned layer 43, the resistance to the current flowing through the spin-valve film 40 becomes greatest.

On the other hand, when the direction of magnetization of the free layer 45 is the same (parallel) as the direction of magnetization of the pinned layer 43, the resistance to the current flowing through the spin-valve film 40 becomes smallest.

Thus, since its resistance changes in accordance with the external magnetic field applied thereto, the spin-valve 40 functions as a magnetic sensor element for sensing a magnetic signal from the magnetic tape 2 by reading changes in resistance.

The foundation layer 41 and the protection layer 46 are there to suppress an increase in the resistivity of the spin-valve film 40, and may be made of, for example, Ta or the like.

Further, in order to stabilize the operation of the GMR element 27, as indicated in FIGS. 3 and 4, there are provided on both ends of the spin-valve film 40 in the longitudinal direction a pair of permanent magnetic films 28a and 28b for applying a bias magnetic field to the GMR element 27.

The width of the portion interposed between the pair of permanent magnetic films 28a and 28b corresponds to a reproducing track width Tw of the GMR element 27. Further, on the pair of permanent magnetic films 28a and 28b, there are provided a pair of resistance lowering films 29a and 29b for lowering the resistance of the GMR element 27.

Further, in the GMR element 27, a pair of conductors 30a and 30b for supplying a sense current to the spin-valve film are provided such that they are connected on one end to the permanent magnetic film 28a and the resistance lowering film 29a, and the permanent magnetic film 28b and the resistance lowering films 29b, respectively.

On the other end of the pair of conductors 30a and 30b, there are provided a pair of external connector terminals 31a and 31b, respectively, for connecting with external circuitry.

The protection film 22 covers the main surface of the first core member 21 on which the GMR head 20 is formed except for the areas from which the external connection terminals 31a and 31b face outward, and the protection film also joins the first core member, on which the GMR head 20 is formed, and the second core member 23.

The GMR head 20 shown in FIGS. 3 and 4 has the GMR element 27 and its surroundings enlarged for purposes of illustration and making its features more easily recognizable. However, in practice, the GMR element 27 is very small in comparison with the first core member 21 and the second core member 23. Therefore, the portion of the GMR head 20 exposed to the outside in the medium sliding surface 20a is almost only the upper end surface where the first and the second core members 21 and 22 meet each other.

The GMR head 20 described above is adhered to a chip base (not shown), and the pair of external connector terminals 31a and 31b are electrically connected to connector terminals provided on the chip base. The GMR head 20 mounted on the chip base is attached to the rotary drum 9 shown in FIG. 2 as the pair of reproducing magnetic heads 12a and 12b.

In the magnetic recording/reproducing apparatus 1, because the GMR head 20 performs reproducing operations while in contact with the magnetic tape 2, a protection film, such as a DLC (Diamond Like Carbon) film or the like, cannot be formed on the medium sliding surface 20a of the GMR head 20 that contacts the magnetic tape 2. Therefore, in conventional apparatuses, because the medium sliding surface of the conventional GMR head is in direct contact with the atmosphere, there is a problem in that corrosion and the like are likely to occur under harsh conditions such as high temperatures and high humidity conditions or in seawater atmosphere.

In consideration of the problem described above, the GMR head 20 in a magnetic recording/reproducing apparatus related to the present invention makes it possible to perform an appropriate reading operation with respect to the magnetic tape 2 even in cases where a protection film is not formed on the medium sliding surface 20a of the GMR head 20 by using a spin-valve film which exhibits excellent corrosion resistance and is capable of maintaining a high MR ratio.

Specifically, the anti-ferromagnetic layer 42 of the spin-valve film 40 is formed using a material having excellent corrosion resistance, a suitable example of which includes, PtMn, NiO, IrMn, CrMnPt, α-Fe$_2$O$_3$, RhMn, NiMn, PdPtMn and the like.

The non-magnetic layer 44 of the spin-valve film 40 may be formed of Au or a Cu alloy. Examples of a Cu alloy include CuAu, CuPd, CuPt, CuNi, CuRu and CuRh.

If the non-magnetic layer 44 is formed using CuAu, assuming the composition ratio of Cu:Au is (100−a$_1$):a$_1$ (where a$_1$ is an atomic %), the composition range should preferably be $25 \leq a_1 \leq 100$. It is further preferable that it be $25 \leq a_1 \leq 75$, and still further preferable that it be $25 \leq a_1 \leq 45$.

If the nonmagnetic layer 44 is formed using CuPd, assuming the composition ratio of Cu:Pd is (100−a$_2$):a$_2$ (where a$_2$ is an atomic %), the composition range should preferably be $5 \leq a_2 \leq 25$.

If the nonmagnetic layer 44 is formed using CuPt, assuming the composition ratio of Cu:Pt is (100−a$_3$):a$_3$ (where a$_3$ is an atomic %), the composition range should preferably be $5 \leq a_3 \leq 20$.

If the nonmagnetic layer 44 is formed using CuRu, assuming the composition ratio of Cu:Ru is (100−a$_4$):a$_4$ (where a$_4$ is an atomic %), the composition range should preferably be $3 \leq a_4 \leq 15$.

If the nonmagnetic layer 44 is formed using CuNi, assuming the composition ratio of Cu:Ni is (100−a$_5$):a$_5$ (where a$_5$ is an atomic %), the composition range should preferably be $25 \leq a_5 \leq 50$.

If the nonmagnetic layer 44 is formed using CuRh, assuming the composition ratio of Cu:Rh is (100−a$_6$):a$_6$ (where a$_6$ is an atomic %), that the composition range should preferably be $7 \leq a_6 \leq 20$.

Corrosion tests were conducted on the spin-valve film 40 using an electrochemical method to measure changes in resistance after a corrosion test, and after the corrosion test, the surface was observed for occurrences of corrosion.

In the corrosion test, a standard hydrogen electrode (SHE) was used as a reference electrode, and the corrosion potential relative to the standard hydrogen electrode while immersed in a NaCl solution of a concentration of 0.1 mol/L was measured.

The corrosion potential will vary depending on the type or concentration of the solution used. In particular, the corrosion potential of metals or alloys will change substantially depending on whether a reaction with Cl takes place or not. Therefore, the corrosion test presently described focuses on occurrences of corrosion under harsh conditions such as high temperature and humidity conditions, seawater atmosphere or the like. For this reason, the polarization curve in cases where a NaCl solution of a concentration of 0.1 mol/L was used was measured.

Figure 6:
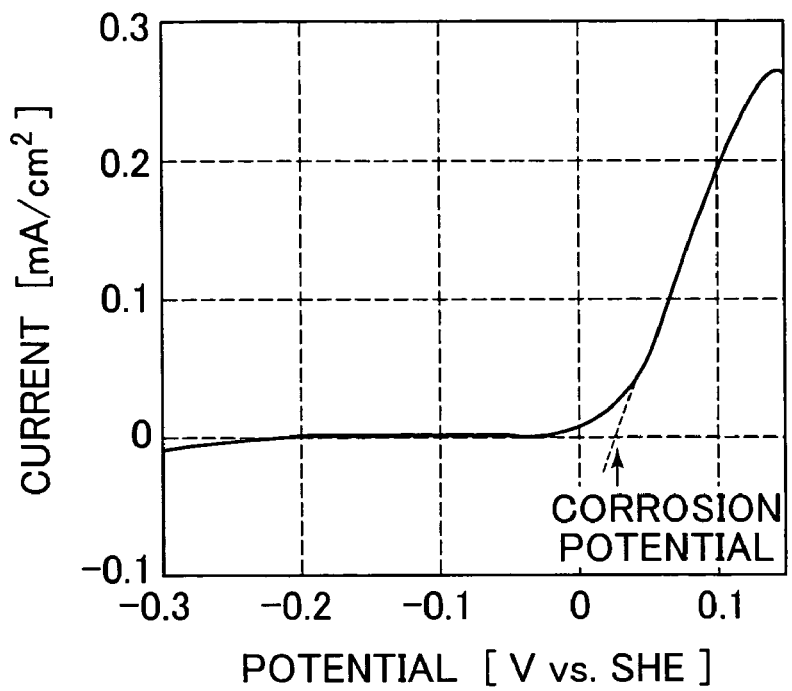
FIG. 6 is an explanatory chart relating to the definition of corrosion potential.

A polarization curve obtained using a predetermined sample is shown in FIG. 6. A potential value extrapolated from the polarization curve where the current density in the sample electrode is 0.1 mA/cm$^2$ or more is herein defined as the corrosion potential (Reference: "Physical properties of spin-valve materials" by Satoru Oikawa et al., The Institute of Electronics, Information and Communication Engineers, MR96-91 (1997–01) pp. 21–28).

Further, in this corrosion test, Ag/AgCl was used for the reference electrode, and Pt was used for a measuring electrode. Measurements of corrosion potential were taken at room temperature (approximately 20° C.). Then, the standard hydrogen electrode (SHE) was compensated with a measured corrosion potential, and the corrected value was taken to be the corrosion potential in this corrosion test. The rising rate of the potential during measurements is approximately 0.5 mV/sec. The thickness of the sample was approximately 100 nm, and the pH value of the NaCl solution was 7.

In addition, the corrosion potential and the change in resistance after the corrosion test may be measured by any one of the following methods: taking measurements of each single film of the respective layers constituting the spin-valve film 40 in order to examine their film characteristics; taking measurements of the layered films which constitute the main portion of the spin-valve 40, in which the pinned layer 43 and the free layer 45 are layered with the non-magnetic layer 44 in between, in order to examine the compatibility of the films taking local cell effects into consideration; and taking measurements of the layered films in which the respective layers constituting the spin-valve film 40 are layered. In the present case, the corrosion potential and the change in resistance after the corrosion test were obtained through measurements of single films of the respective layers of the spin-valve film 40.

Further, in observing the surface, tests were performed on single layer films as described above, as well as on layered films in which the respective layers were layered on a foundation film of a metal having a high corrosion potential such as Au in consideration of local cell effects. This is because layered films in contact with Au tend to corrode more readily than single layer films due to local cell effects.

Figure 7:
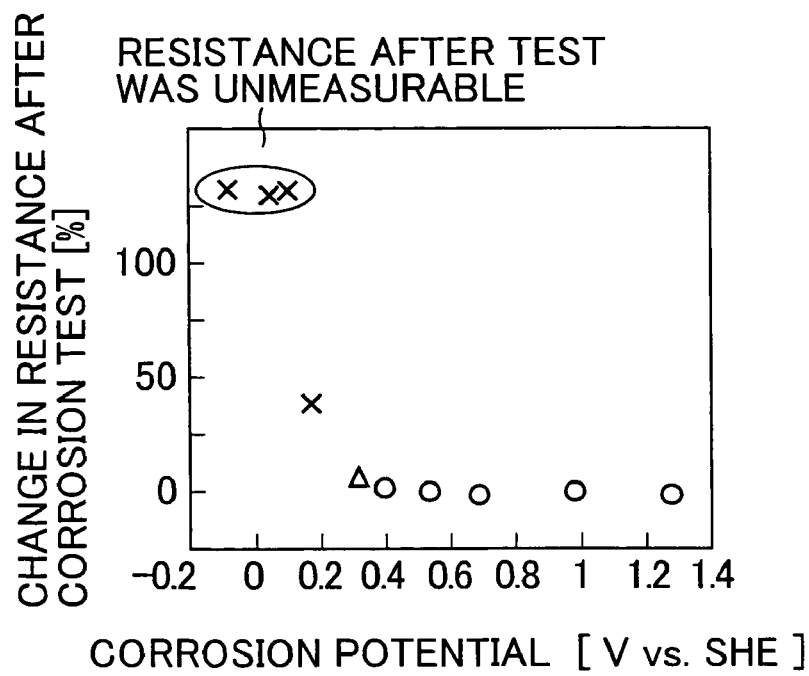
FIG. 7 shows the relationship between corrosion potential and the change in resistance after a corrosion test, and the results of surface observations.

A plurality of samples of the spin-valve film 40 having the configurations shown in FIGS. 5A through 5C were prepared by varying the material composition or the thickness. With respect to these samples, the relationship between the corrosion potential and changes in resistance after the corrosion test thus measured as well as the results from observing the surface are shown in FIG. 7. In FIG. 7, a circle indicates that there were no changes from corrosion on the surface, a triangle indicates that a slight change in color occurred on the surface, and a cross indicates that corrosion occurred on the surface.

As indicated in FIG. 7, from the measurements of the changes in resistance after the corrosion test and the results from observing the surface, it can be seen that there is a drastic change around the point where the corrosion potential is +0.4 [V vs. SHE]. In other words, when the corrosion potential is greater than +0.4 [V vs. SHE], no corrosion was identified on the surface of the spin-valve film 40, and almost no change in resistance was seen after the corrosion test.

On the other hand, when the corrosion potential is smaller than +0.4 [V vs. SHE], corrosion occurred on the surface of the spin-valve film 40, and the change in resistance after the corrosion test increased rapidly. When the corrosion potential decreased further, corrosion progressed to an extent where it was impossible to measure the resistance.

From the description above, for the spin-valve film 40, it is preferable for the corrosion potential relative to the standard hydrogen electrode when measured while immersed in a NaCl solution of a concentration of 0.1 mol/L to be +0.4 [V vs. SHE] or above. As a result, in the GMR head, the occurrence of corrosion in the spin-valve film can be prevented, and a high MR ratio can be maintained.

Next, the relationship between the material composition ratio and corrosion potential was examined with respect to cases where the non-magnetic layer 44 of the spin-valve film 40 was formed using one of Au, CuAu, CuPd, CuPt, CuRu, CuNi and CuRh.

<A Case where the Non-magnetic Layer is Formed Using Au or CuAu>

Figure 8:
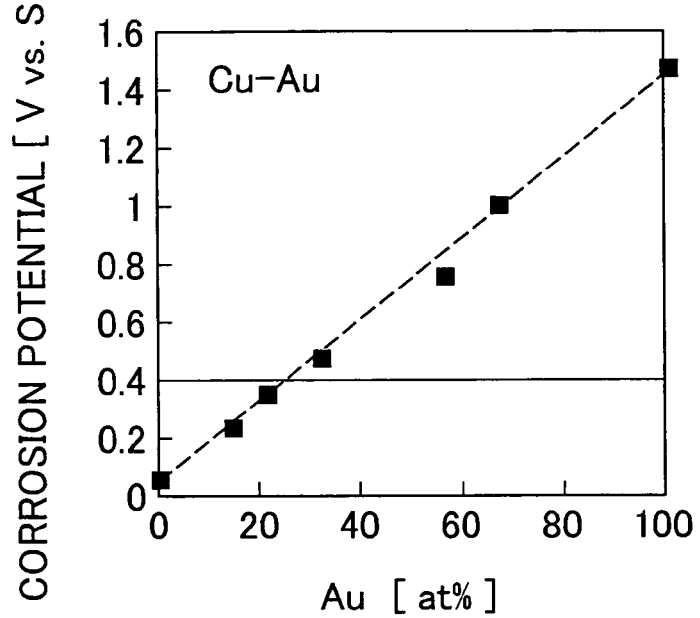
FIG. 8 shows the relationship between the composition ratio of a non-magnetic layer and corrosion potential relative to a standard hydrogen electrode.

Measurements of the corrosion potential [V vs. SHE] of the non-magnetic layer 44 relative to the standard hydrogen electrode are shown in FIG. 8 with the amount of Au added to Cu varied.

As shown in FIG. 8, the relationship between the Cu:Au ratio and the corrosion potential was substantially proportional, and as the amount of Au added to Cu increased, the corrosion potential became higher. It was found that, by making the amount of Au added be 25 atomic % or greater, the corrosion potential relative to the standard hydrogen electrode became +0.4 [V vs. SHE] or greater.

Figure 9:
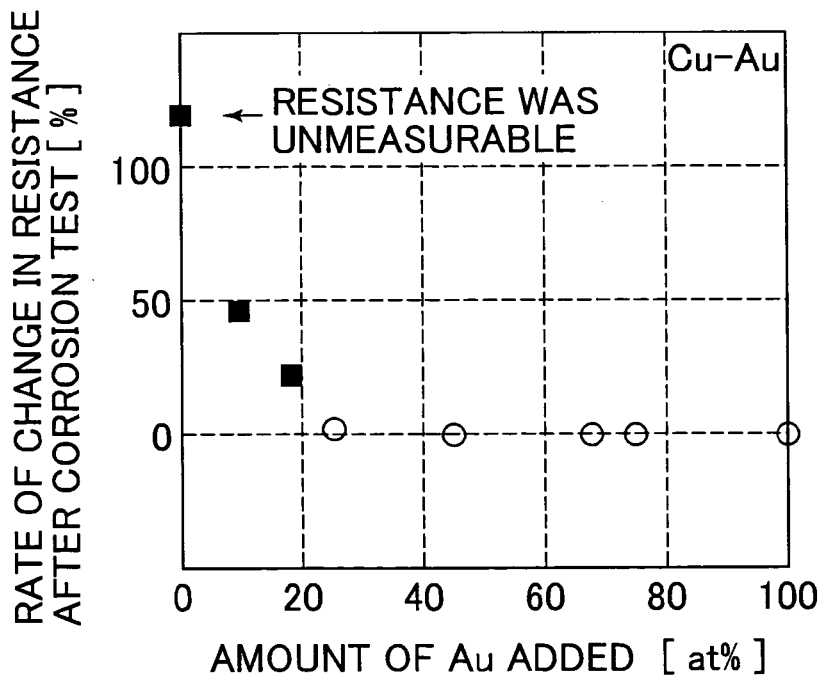
FIG. 9 shows the relationship between the composition ratio of a non-magnetic layer and the rate of change in resistance after a corrosion test, and the results of surface observations where the non-magnetic layer is made of CuAu.

Next, the change in resistance of the non-magnetic layer 44 after the corrosion test described above and the results of observing the surface are shown in FIG. 9 with respect to a case where the non-magnetic layer 44 was formed using CuAu.

In FIG. 9, a circle indicates that no corrosion was confirmed on the surface, and a solid square indicates corrosion was confirmed on the surface.

As shown in FIG. 9, when the non-magnetic layer 44 was formed using CuAu, it was found from the measurements of the change in resistance after the corrosion test as well as the results from observing the surface that by making the amount of Au added be 25 atomic % or greater, the change in resistance after the corrosion test was suppressed, corrosion did not occur, and excellent corrosion resistance could be obtained.

When the non-magnetic layer 44 was formed using CuAu, the magnetoresistance ratio became higher the lower the amount of AU added was.

Thus, assuming the composition ratio of Cu:Au is $(100-a_1):a_1$ (where $a_1$ is an atomic %), respectively, it is preferable that the composition range be $25 \leq a_1 \leq 100$, more preferably $25 \leq a_1 \leq 75$, and still further preferably $25 \leq a_1 \leq 45$. As a result, even in a case where no protection film is formed on the medium sliding surface 20a of the GMR head 20, it is possible to prevent occurrences of corrosion in the non-magnetic layer 44, and to obtain superior corrosion resistance and superior magnetoresistive effects.

<A Case where the Non-magnetic Layer is Formed Using CuPd>

Figure 10:
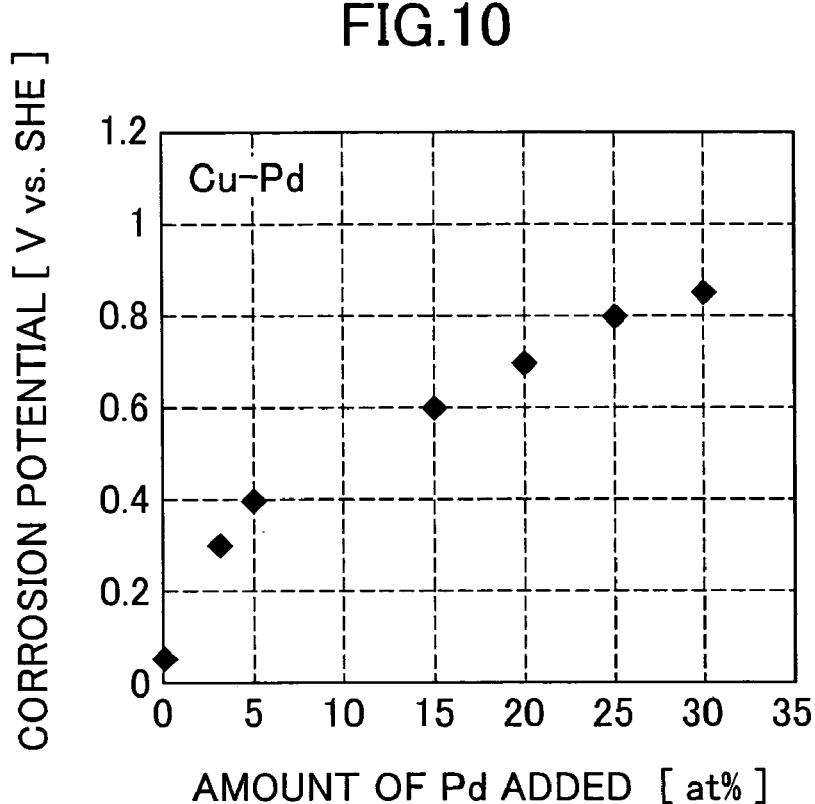
FIG. 10 shows the relationship between the composition ratio of a non-magnetic layer and corrosion potential relative to a standard hydrogen electrode.

Measurements of the corrosion potentials [V vs. SHE] of the non-magnetic layer 44 relative to the standard hydrogen electrode are shown in FIG. 10 with the amount of Pd added to Cu varied.

As shown in FIG. 10, the relationship between the amount of Pd added with respect to Cu and the corrosion potential was substantially proportional, and by making the amount of Pd added be 5 atomic % or greater, the corrosion potential relative to the standard hydrogen electrode became +0.4 [V vs. SHE] or greater.

Figure 11:
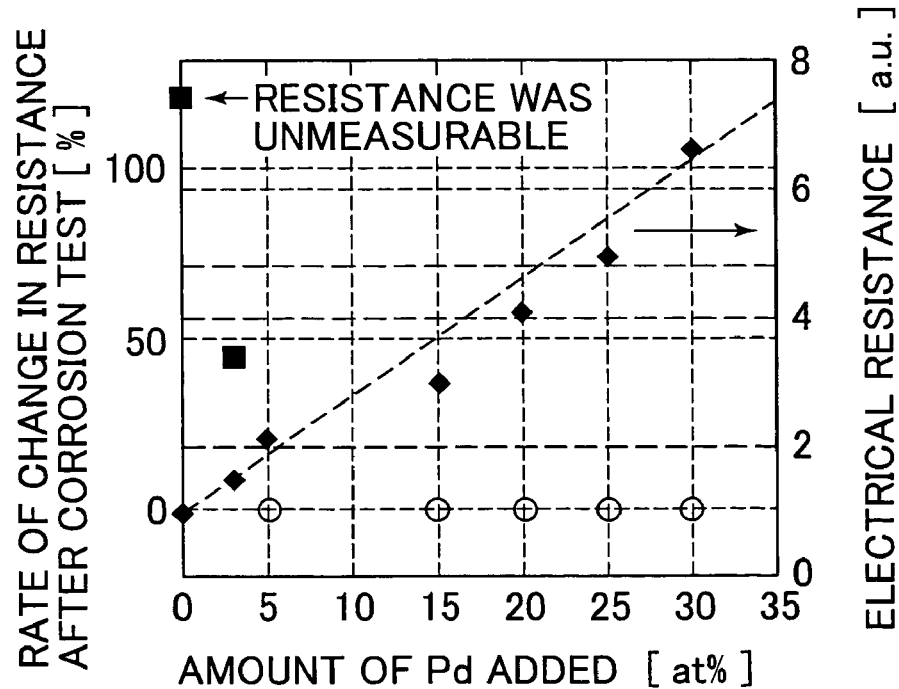
FIG. 11 is a characteristics chart in which the composition ratio, the rate of change in resistance after a corrosion test, the result of surface observations and measurements of electrical resistance are plotted for a non-magnetic layer of CuPd.

Next, the rate of change in resistance of the non-magnetic layer 44 after the corrosion test described above and the results of observing the surface as well as the electrical resistance of the non-magnetic layer are shown in FIG. 11 with respect to a case where the non-magnetic layer 44 was formed using CuPd.

In FIG. 11, a circle indicates that no corrosion occurred on the surface, and a solid square indicates corrosion did occur on the surface. Electrical resistance is expressed as a ratio in relation to Cu.

As shown in FIG. 11, when the non-magnetic layer 44 is formed using CuPd, it was found from the measurements of the change in resistance after the corrosion test as well as the results from observing the surface that by making the amount of Pd added be 5 atomic % or greater, corrosion did not occur, and excellent corrosion resistance could be obtained.

As indicated by solid diamonds in FIG. 11, it can be seen that the electrical resistance of CuPd increases with the increase in the amount of Pd added. When the amount of Pd added exceeds 25 atomic %, the electrical resistance of the non-magnetic layer 44 increases to an extent that it interferes with practical use of the spin-valve film and the magnetoresistive effects are lowered. Thus, in order to reduce the electrical resistance to a value suitable for practical use, it is preferable that the amount of Pd added be 25 atomic % or below. It is further preferable that it be approximately 20 atomic % or below.

From the description above, when the non-magnetic layer 44 is formed of CuPd, assuming that the composition ratio of Cu:Pd is $(100-a_2):a_2$ (where $a_2$ is an atomic %), respectively, it is preferable that the composition range be $5 \leq a_2 \leq 25$.

<A Case where the Non-magnetic Layer is Formed Using CuPt>

Figure 12:
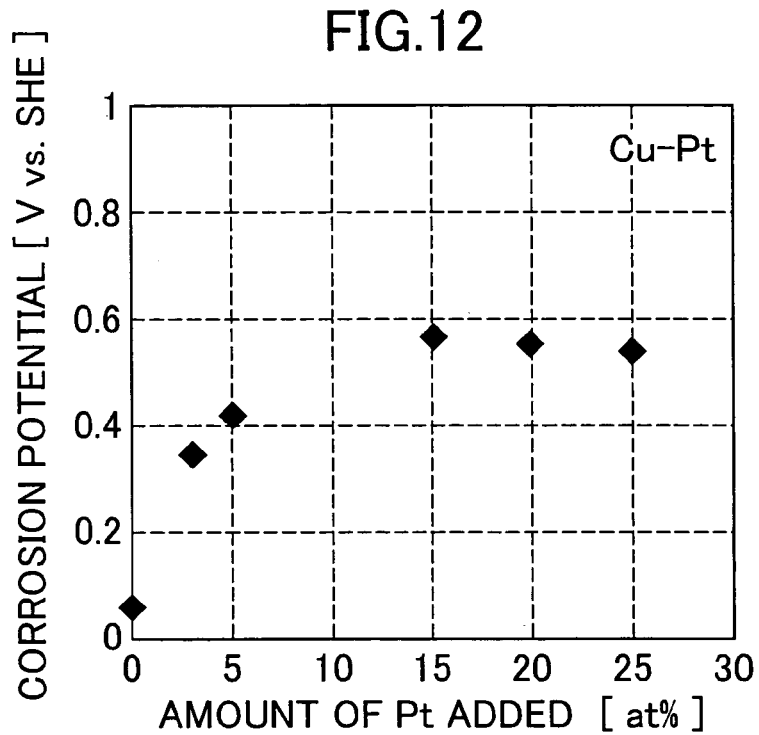
FIG. 12 shows the relationship between the composition ratio of a non-magnetic layer and corrosion potential relative to a standard hydrogen electrode.

Measurements of the corrosion potential of the non-magnetic layer 44 relative to the standard hydrogen electrode [V vs. SHE] are shown in FIG. 12 with the amount of Pt added to Cu varied.

As shown in FIG. 12, by making the amount of Pt added with respect to Cu be 5 atomic % or greater, the corrosion potential relative to the standard hydrogen electrode became +0.4 [V vs. SHE] or greater.

Figure 13:
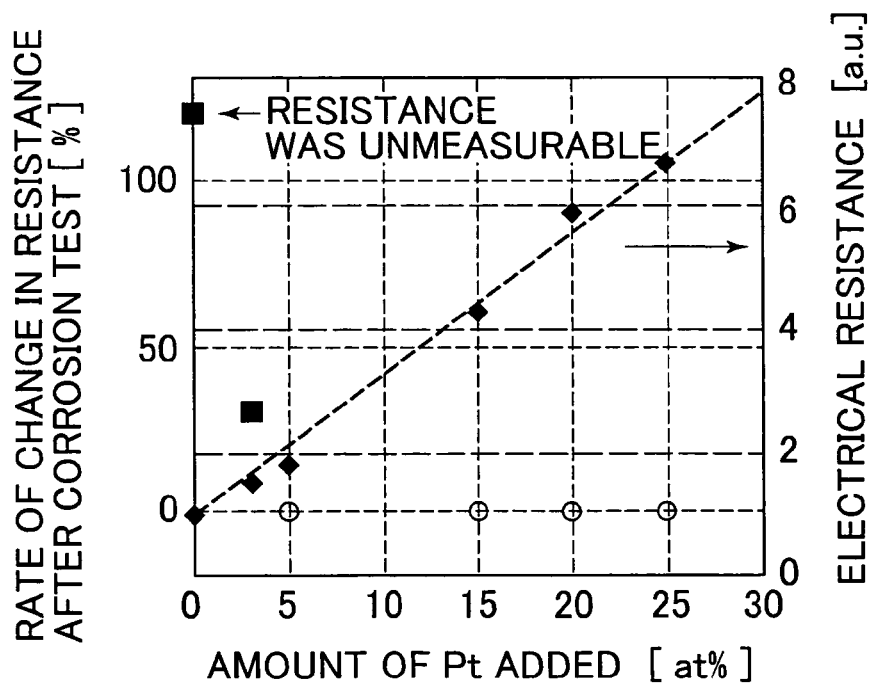
FIG. 13 is a characteristics chart in which the composition ratio, the rate of change in resistance after a corrosion test, the result of surface observations and measurements of electrical resistance are plotted for a non-magnetic layer of CuPt.

Next, the change in resistance of the non-magnetic layer 44 after the corrosion test described above and the results of observing the surface, as well as the electrical resistance of the non-magnetic layer are shown in FIG. 13 with respect to a case where the non-magnetic layer 44 was formed using CuPt.

In FIG. 13, a circle indicates that no change occurred on the surface, and a solid square indicates that corrosion occurred on the surface. Electrical resistance is expressed as a ratio in relation to Cu.

As shown in FIG. 13, when the non-magnetic layer 44 is formed using CuPt, it was found from the measurements of the change in resistance after the corrosion test as well as the results from observing the surface that by making the amount of Pt added be 5 atomic % or greater, corrosion did not occur, and superior corrosion resistance could be obtained.

In the spin-valve film 40, there must be exchange-coupling between the anti-ferromagnetic layer 42 and the pinned layer 43. Therefore, when PtMn is used for the anti-ferromagnetic layer 42, annealing for a transformation of an antimagnetic layer is required.

When the non-magnetic layer 44 is formed using CuPt, if 20 atomic % of Pt or more is added, CuPt is caused to transform to a tetragonal system through the annealing for a transformation of an antimagnetic layer described above.

Further, as indicated by solid diamonds in FIG. 13, the electrical resistance of CuPt was found to increase with the amount of Pt added. When the amount of Pt added exceeded 20 atomic %, the electrical resistance of the non-magnetic layer 44 increased to an extent that it interfered with practical use of the spin-valve film and the magnetoresistive effects were lowered. Thus, in order to reduce the electrical resistance to a value suitable for practical use, it is preferable that the amount of Pt added be 20 atomic % or below. It is further preferable that it be approximately 15 atomic % or below.

From the description above, when the non-magnetic layer 44 is formed of CuPt, assuming that the composition ratio of Cu:Pt is $(100-a_3):a_3$ (where $a_3$ is an atomic %), respectively, it is preferable that the composition range be $5 \leq a_3 \leq 20$.

<A Case where the Non-magnetic Layer is Formed Using CuRu>

Figure 14:
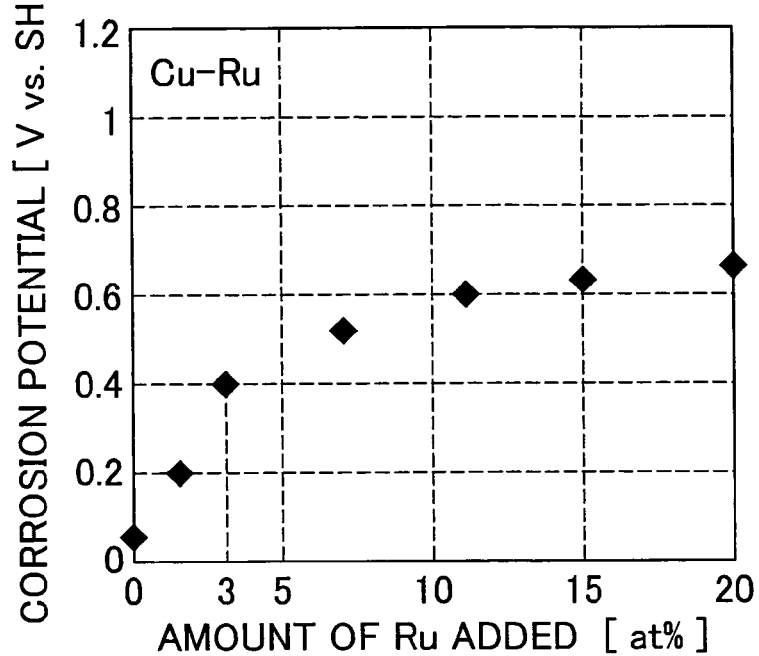
FIG. 14 shows the relationship between the composition ratio of a non-magnetic layer and corrosion potential.

Measurements of the corrosion potential of the non-magnetic layer 44 relative to the standard hydrogen electrode [V vs. SHE] are shown in FIG. 14 with the amount of Ru added to Cu varied.

As shown in FIG. 14, the relationship was such that as the amount of Ru added with respect to Cu increased, the corrosion potential became greater. It was found that, by making the amount of Ru added be 3 atomic % or greater, the corrosion potential relative to the standard hydrogen electrode mentioned above became +0.4 [V vs. SHE] or greater.

Figure 15:
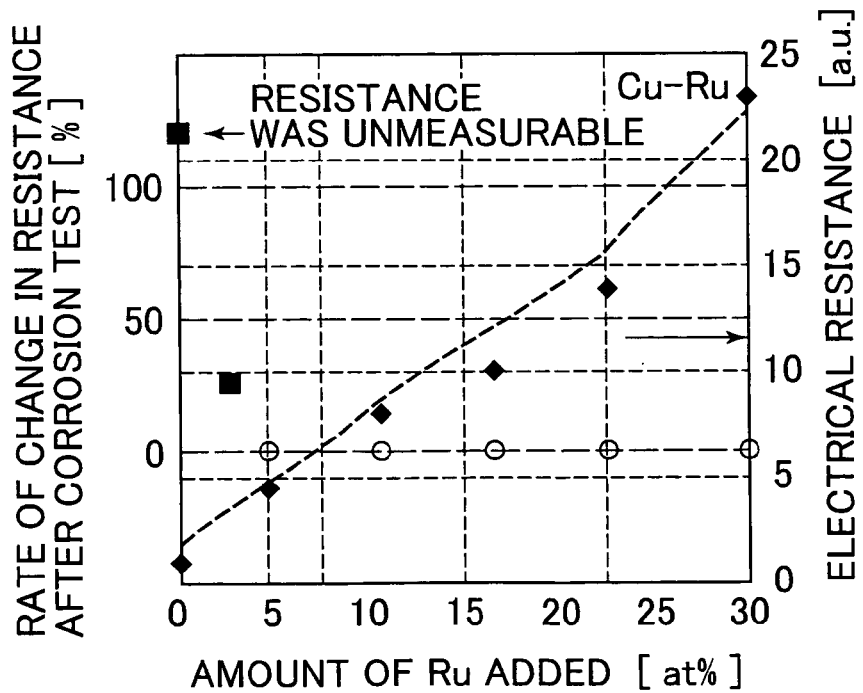
FIG. 15 is a characteristics chart in which the composition ratio, the rate of change in resistance after a corrosion test, the result of surface observations and measurements of electrical resistance are plotted for a non-magnetic layer of CuRu.

Next, the rate of change in resistance of the non-magnetic layer 44 after the corrosion test described above and the results of observing the surface as well as the electrical resistance of the non-magnetic layer are shown in FIG. 15 with respect to a case where the non-magnetic layer 44 was formed using CuRu.

In FIG. 15, a circle indicates that no change occurred on the surface, and a solid square indicates that corrosion did occur on the surface. Electrical resistance is expressed as a ratio in relation to Cu.

As shown in FIG. 15, when the non-magnetic layer 44 was formed using CuRu, it was found from the measurements of the change in resistance after the corrosion test as well as the results from observing the surface that by making the amount of Ru added be 3 atomic % or greater, corrosion did not occur, and superior corrosion resistance could be obtained.

Further, as indicated by solid diamonds in FIG. 15, the electrical resistance of CuRu increased as the amount of Ru added increased.

When the amount of Ru added exceeded 15 atomic %, the electrical resistance of the non-magnetic layer 44 increased to an extent that it interfered with practical use of the spin-valve film and the magnetoresistive effects were lowered. Thus, in order to reduce the electrical resistance to a value suitable for practical use, it is preferable that the amount of Ru added be 15 atomic % or below. It is further preferable that it be approximately 10 atomic % or below.

From the description above, when the non-magnetic layer 44 is formed of CuRu, assuming that the composition ratio of Cu:Ru is $(100-a_5):a_4$ (where $a_4$ is an atomic %), respectively, it is preferable that the composition range be $3 \leq a_4 \leq 15$.

<A Case where the Non-magnetic Layer is Formed Using CuNi>

Figure 16:
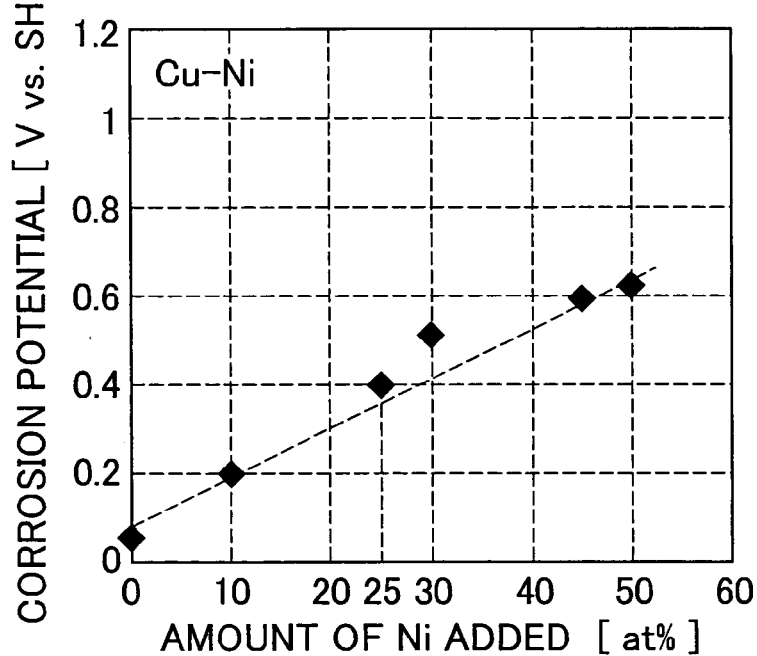
FIG. 16 shows the relationship between the composition ratio of a non-magnetic layer and corrosion potential.

Measurements of the corrosion potential of the non-magnetic layer 44 relative to the standard hydrogen electrode [V vs. SHE] are shown in FIG. 16 with the amount of Ni added to Cu varied.

The relationship between the amount of Ni added with respect to Cu and the corrosion potential was approximately proportional as shown in FIG. 16, and by making the amount of Ni added be 25 atomic % or greater, the corrosion potential relative to the standard hydrogen electrode became +0.4 (V vs. SHE) or greater.

Figure 17:
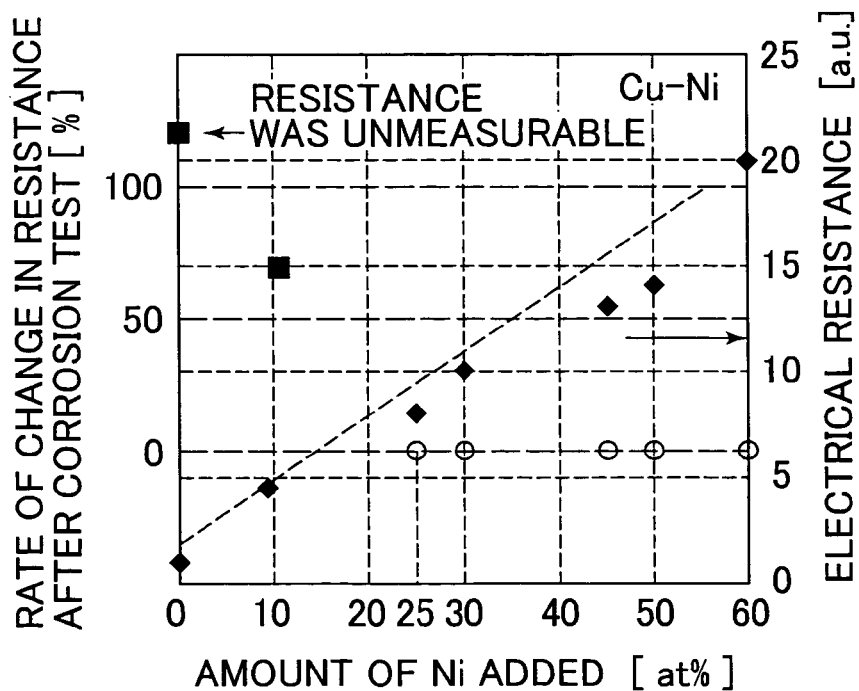
FIG. 17 is a characteristics chart in which the composition ratio, the rate of change in resistance after a corrosion test, the result of surface observations and measurements of electrical resistance are plotted for a non-magnetic layer of CuNi.

Next, the rate of change in resistance of the non-magnetic layer 44 after the corrosion test described above and the results of observing the surface as well as the electrical resistance of the non-magnetic layer are shown in FIG. 17 with respect to a case where the non-magnetic layer 44 was formed using CuNi.

In FIG. 17, a circle indicates that no change occurred on the surface, and a solid square indicates that corrosion did occur on the surface. The electrical resistance of the non-magnetic layer 44 is expressed numerically in comparison with a case where the non-magnetic layer 44 was formed using Cu.

As shown in FIG. 17, when the non-magnetic layer 44 is formed using CuNi, it was found from the measurements of the change in resistance after the corrosion test as well as the results from observing the surface that by making the amount of Ni added be 25 atomic % or greater, corrosion did not occur, and superior corrosion resistance could be obtained.

Further, as indicated by solid diamonds in FIG. 17, the electrical resistance of CuNi increased as the amount of Ni added increased.

When the amount of Ni added exceeded 50 atomic %, the electrical resistance of the non-magnetic layer 44 increased to an extent that it interfered with practical use of the spin-valve film and the magnetoresistive effects were lowered. Thus, in order to reduce the electrical resistance to a value suitable for practical use, it is preferable that the amount of Ni added be 50 atomic % or below. It is further preferable that it be approximately 45 atomic % or below.

From the description above, when the non-magnetic layer 44 is formed of CuNi, assuming that the composition ratio of Cu:Ni is $(100-a_5):a_5$ (where $a_5$ is an atomic %), respectively, it is preferable that the composition range be $25 \leq a_5 \leq 50$.

<A Case where the Non-magnetic Layer is Formed Using CuRh>

Figure 18:
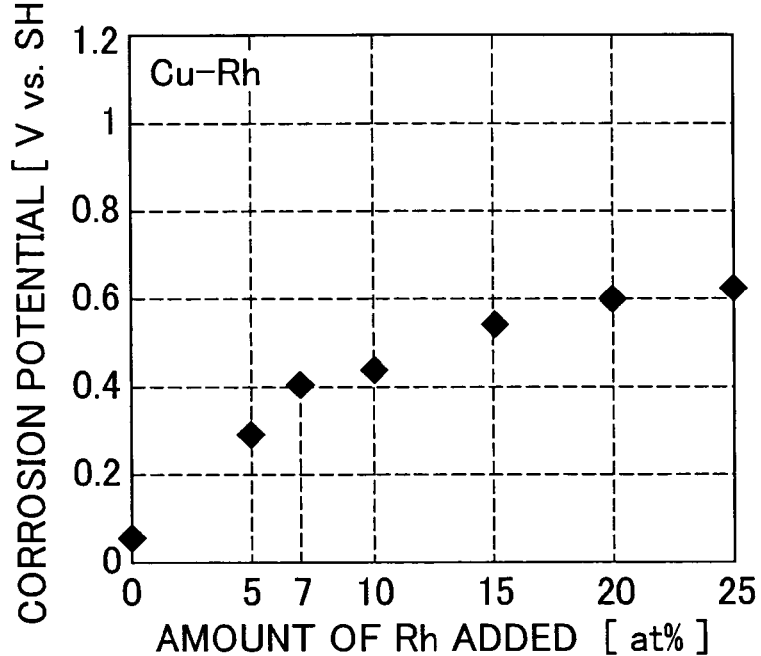
FIG. 18 shows the relationship between the composition ratio of a non-magnetic layer and corrosion potential.

Measurements of the corrosion potential of the non-magnetic layer 44 relative to the standard hydrogen electrode [V vs. SHE] are shown in FIG. 18 with the amount of Ni added varied.

As shown in FIG. 18, by making the amount of Rh added be 7 atomic % or greater, the potential relative to the standard hydrogen electrode became +0.4 (V vs. SHE) or greater.

Figure 19:
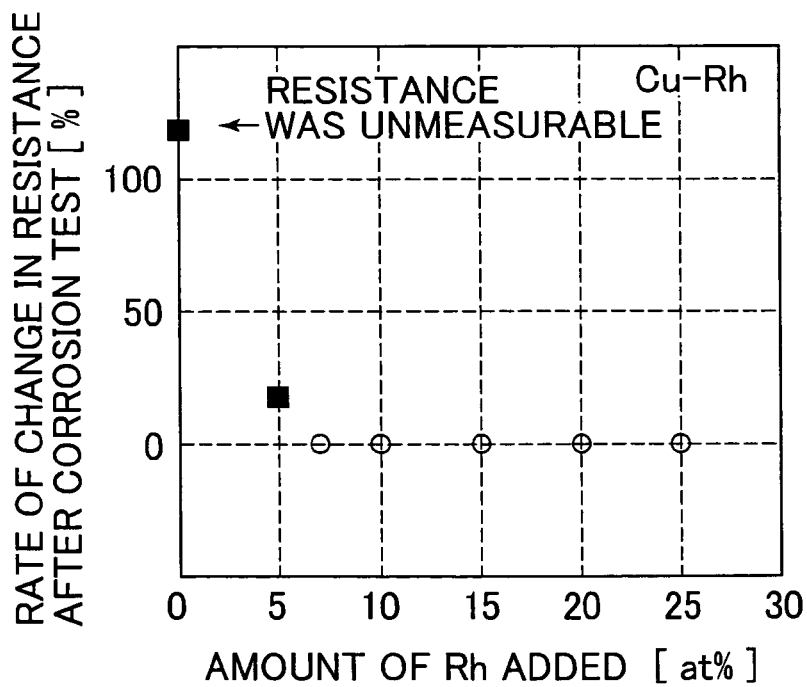
FIG. 19 is a characteristics chart in which the composition ratio, the rate of change in resistance after a corrosion test, the result of surface observations and measurements of electrical resistance are plotted for a non-magnetic layer of CuRh.
Figure 20:
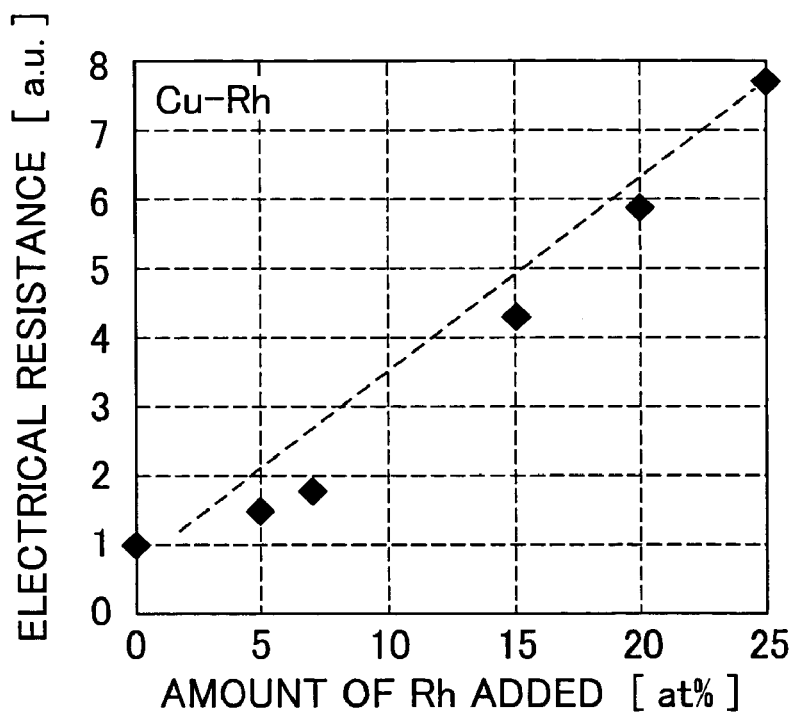
FIG. 20 shows a characteristics chart in which composition ratio and electrical resistance are plotted for a non-magnetic layer of CuRh.

Next, with respect to a case where the non-magnetic layer 44 was formed using CuRh, the rate of change in resistance of the non-magnetic layer 44 after the corrosion test described above and the results of observing the surface are shown in FIG. 19, and the amount of Rh added and the electrical resistance before and after the corrosion test are shown in FIG. 20.

In FIG. 19, a circle indicates that no change occurred on the surface, and a solid square indicates that corrosion did occur on the surface. The electrical resistance in FIG. 20 is expressed as a ratio in relation to Cu.

As shown in FIG. 19, when the non-magnetic layer 44 was formed using CuRh, it was found from the measurements of the change in resistance after the corrosion test as well as the results from observing the surface that by making the amount of Rh added be 7 atomic % or greater, corrosion did not occur, and superior corrosion resistance could be obtained.

Further, as indicated by solid diamonds in FIG. 20, the electrical resistance of CuRh increased as the amount of Rh added increased. When the amount of Rh added exceeded 20 atomic %, the electrical resistance of the non-magnetic layer 44 increased significantly, as compared to when the non-magnetic layer 44 was formed solely of Cu, to an extent that it interfered with practical use of the spin-valve film and the magnetoresistive effects were lowered. Thus, in order to reduce the electrical resistance to a value suitable for practical use, it is preferable that the amount of Rh added be 20 atomic % or below.

From the description above, when the non-magnetic layer 44 is formed of CuRh, assuming that the composition ratio of Cu:Rh is $(100-a_6):a_6$ (where $a_6$ is an atomic %), respectively, it is preferable that the composition range be $7 \leq a_6 \leq 20$.

In addition, the non-magnetic layers 44 described above may contain one or more elements arbitrarily selected from Al, Ta, In, B, Nb, Hf, Mo, W, Re, Pt, Pd, Rh, Ga, Zr, Ir, Ag, Ni and Ru.

Next, the pinned layer 43 and the free layer 45 of the spin-valve film 40 will be described.

NiFe or CoNiFe, which exhibit superior corrosion resistance and good soft magnetic characteristics are used for the pinned layer 43 and the free layer 45. They may be used alone or in combination. Further, the pinned layer 43 and the free layer 45 may have a layered structure in which these alloys are layered or a synthetic ferrimagnetic structure in which these alloys and a non-magnetic film made of, for example, Ru or the like are layered alternately.

For the pinned layer 43 and the free layer 45, a plurality of samples made of NiFe or CoNiFe alloys, in which the composition ratio of Co:Ni:Fe was varied, were prepared. Then, for each sample, corrosion tests were carried out using a NaCl solution in the same manner as described above, and the surface was observed after the corrosion test to check for occurrences of corrosion.

Figure 21:
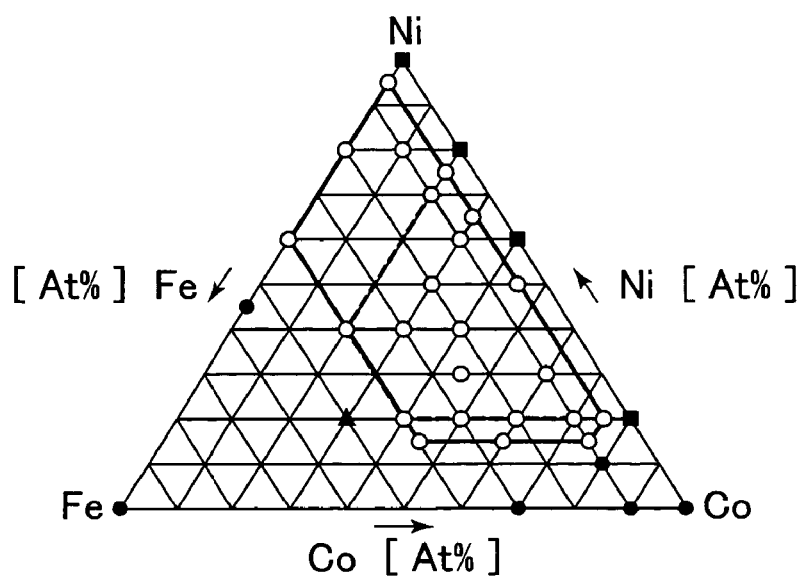
FIG. 21 shows the results of a corrosion test of a pinned layer and a free layer where the composition ratio is varied.

In FIG. 21, the evaluation results of the corrosion test, where the composition ratio of Co:Ni:Fe was varied, is shown. In FIG. 21, a circle indicates that there was no surface corrosion, and that the corrosion potential relative to the standard hydrogen electrode measured while immersed in a NaCl solution of a concentration of 0.1 mol/L became +0.4 [V vs. SHE] or greater, and a solid circle indicates that surface corrosion occurred.

Further, a solid square indicates that the coercive force Hc became larger than 10 Oe (796 A/m), and a solid triangle indicates a transition to the bcc phase (body centered cubic structure). If Hc>10 Oe, the magnetoresistive effects deteriorate due to the increase in coercive force.

Further, as to NiFe or CoNiFe, their magnetoresistive effects are higher in the fcc phase (face centered cubic structure). On the other hand, when they take on other crystalline structures, the magnetoresistive effects thereof deteriorate due to a lattice mismatch at the interface. Also, when both the fcc phase and the bcc phase coexist, the magnetoresistive effects deteriorate due to occurrences of a lattice mismatch at the interface.

As shown in FIG. 21, it was found that when the amount of Co or Ni contained was larger than 75 atomic % or smaller than 15 atomic %, respectively, in relation to Co, Ni and Fe, corrosion tended to occur more easily in the pinned layer 43 as well as in the free layer 45. Further, when the amount of Ni or Fe contained was larger than 95 atomic % or smaller than 5 atomic %, respectively, in relation to Co, Ni and Fe, it was found that the coercive force Hc of the pinned layer 43 and the free layer 45 became greater, and the magnetoresistive effects deteriorated.

Still further, when the amount of Fe contained became larger than 40 atomic % in relation to Co, Ni and Fe, it was found that corrosion tended to occur more easily in the pinned layer 43 as well as in the free layer 45.

As can be seen from the description above, if the non-magnetic layer is formed using one of Au, CuAu, CuPd, CuPt, CuNi, CuRu and CuRh, and if the pinned layer 43 as well as the free layer 45 are formed using FeNi or CoNiFe, assuming the composition ratio of Co:Ni:Fe is b:c:d (where b, c and d are atomic percentages), their composition ranges should preferably be $0 \leq b \leq 75$, $15 \leq c \leq 95$, $5 \leq d \leq 40$ (where b+c+d=100 atomic %).

Figure 22:
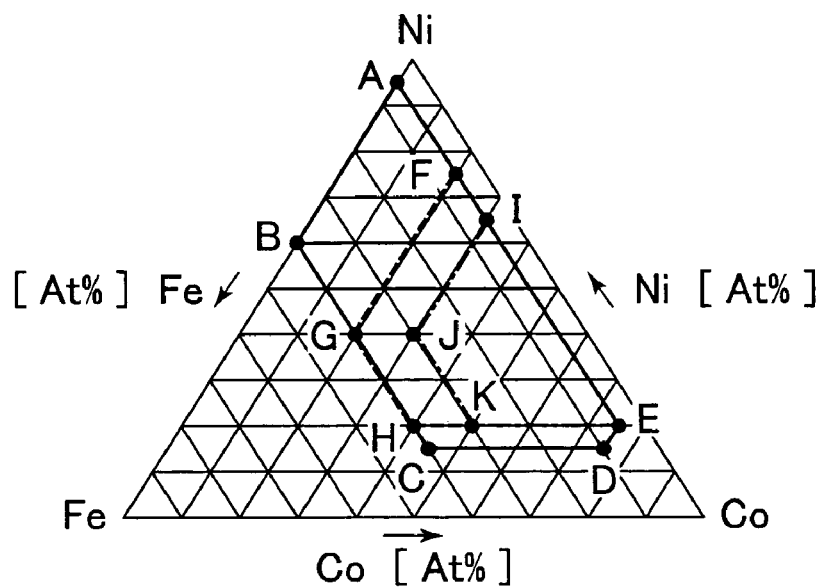
FIG. 22 shows composition ranges suitable for effectively preventing corrosion with respect to a pinned layer and a free layer.

In other words, in the pinned layer 43 and the free layer 45, as shown in FIG. 22, the composition ratio of Co:Ni:Fe should preferably be kept within the range enclosed by the solid lines defined by points A (Co=0 atomic %, Ni=95 atomic %, Fe=5 atomic %), B (Co=0 atomic %, Ni=60 atomic %, Fe=40 atomic %), C (Co=45 atomic %, Ni=15 atomic %, Fe=40 atomic %), D (Co=75 atomic %, Ni=15 atomic %, Fe=10 atomic %), and E (Co=75 atomic %, Ni=20 atomic %, Fe=5 atomic %). By specifying such a composition ratio for the pinned layer 43 and the free layer 45 of the spin-valve film of the magnetoresistive head, superior magnetoresistive effects can be secured while improving corrosion resistance.

In the pinned layer 43 and the free layer 45, it is further preferable that the composition ranges of Co, Ni and Fe be such that $20 \leq b \leq 75$, $20 \leq c \leq 75$, and $5 \leq d \leq 40$. In other words, it is further preferable that the composition ratio of Co:Ni:Fe fall within the area enclosed by the broken lines in FIG. 22 defined by points F (Co=20 atomic %, Ni=75 atomic % and Fe=5 atomic %), G (Co=20 atomic %, Ni=40 atomic % and Fe=40 atomic %), H (Co=40 atomic %, Ni=20 atomic % and Fe=40 atomic %) and E (Co=75 atomic %, Ni=20 atomic % and Fe=5 atomic %).

Thus, the pinned layer 43 and the free layer 45 may exhibit excellent corrosion resistance and may be capable of maintaining a high magnetoresistance ratio, and at the same time may be able to improve the MR ratio by increasing, in particular, the proportion of Co.

Further, by making the composition ranges of Co, Ni and Fe in the pinned layer 43 and the free layer 45 be $40 \leq b \leq 75$, $20 \leq c \leq 65$, $5 \leq d \leq 30$, that is, by keeping the composition ratio of Co:Ni:Fe within the area enclosed by points I (Co=30 atomic %, Ni=65 atomic % and Fe=5 atomic %), J (Co=30 atomic %, Ni=40 atomic % and Fe=30 atomic %), K (Co=50 atomic %, Ni=20 atomic % and Fe=30 atomic %) and E (Co=75 atomic %, Ni=20 atomic % and Fe=5 atomic %) shown in FIG. 22, the pinned layer 43 and the free layer 45 of the magnetoresistive head 20 may exhibit even better corrosion resistance and may be able to maintain a high magnetoresistance ratio, and at the same time balance good corrosion resistance and a high magnetoresistance ratio at a high order.

In addition, in the spin-valve film 40 described above, the pinned layer 43 and the free layer 45 may further contain at least one or more elements selected from Au, Ir, Pt, Al, Ru, Rh, Cr and Pd in addition to NiFe or CoNiFe alloys having the composition ratio described above.

In addition, the pinned layer 43 and the free layer 45, which include NiFe or CoNiFe having the composition ratio described above, may differ from each other in their respective compositions in the spin-valve film 40 or may be configured as a plurality of combinations.

It was confirmed that, by adopting, for a spin-valve film 40 that satisfies the various conditions described above, a configuration in which, for example, Ta as the foundation layer 41, $Ni_{80}Fe_{20}$ and $Co_{50}Ni_{30}Fe_{20}$ alloys as the free layer 45, a $Cu_{70}Au_{30}$ alloy as the non-magnetic layer 44, a $Co_{50}Ni_{30}Fe_{20}$ alloy as the pinned layer 43, PtMn as the anti-ferromagnetic layer 42, and Ta as the protection layer 46 are sequentially layered, good corrosion resistance was exhibited, and that even when no protection film is formed on the medium sliding surface 20a that contacts a magnetic tape, occurrences of corrosion under harsh conditions, such as, for example, high temperature and humidity conditions, seawater atmosphere and the like, could be prevented and appropriate reproduction of information from the magnetic tape 2 could be performed.

In particular, when this GMR head was applied to reproducing magnetic heads 12a and 12b in the magnetic recording/reproducing apparatus 1 using the helical scan system, excellent corrosion resistance was obtained.

Although the present invention is not limited a GMR head of a configuration as described above, and it may be applied also to, for example, a combined magnetic head in which an inductive type magnetic head, which utilizes electromagnetic induction, is provided on a GMR head.

Further, the present invention can be applied also to a tunneling magnetoresistive head equipped with a magnetic tunnel junction element which is formed by layering a pair of magnetic layers with an insulation layer in between, and in which the conductance of a tunnel current flowing from one of the pair of magnetic layers to the other changes depending on the relative angle of magnetization between the pair of magnetic layers.

Next, descriptions will be given below on embodiments of a magnetic recording medium (magnetic tape) suitable for use with the magnetoresistive head of the magnetic recording/reproducing apparatus 1 related to the present invention.

Figure 23:
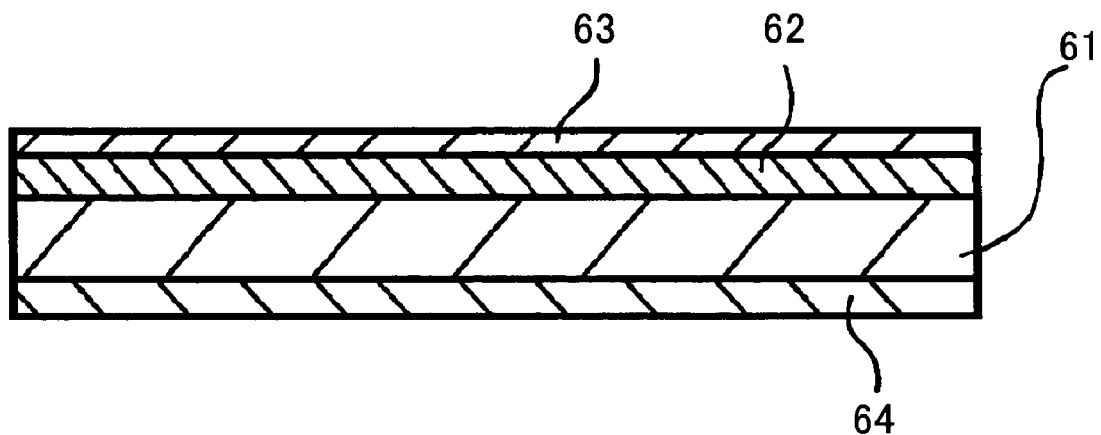
FIG. 23 shows a schematic sectional view of a magnetic recording medium.

As shown in FIG. 23, a magnetic recording medium 2 includes a magnetic metal thin film 62, and a protective layer 63 sequentially formed on a non-magnetic substrate 61, and a back coat layer 64 is formed on the surface opposite the surface on which the metal magnetic thin film 62 is formed.

For the non-magnetic substrate 61, materials conventionally used for base films of magnetic tapes may be used. Examples of such include: polyesters such as polyethylene terephthalate, polyethylene-2, 6-naphthalate, etc.; polyolefins such as polypropylene, etc.; cellulose derivatives such as cellulose triacetate, cellulose diacetate, etc.; plastics such as polyamide, aramide resin, polycarbonate, etc.

The non-magnetic substrate 61 may be designed in a single-layer structure or in a multi-layer structure. Also, the surface of the non-magnetic substrate may be given a surface treatment such as corona discharge treatment, or an organic material layer such as an easily adhesive layer may be formed thereon.

The metal magnetic thin film 62 may be formed through conventionally known methods such as vacuum deposition, sputtering, chemical vapor deposition (CVD), ion plating, etc. In particular, it is preferable to form the metal magnetic thin film 62 through vacuum deposition.

The thickness of the metal magnetic thin film 62 can be controlled by changing the line speed, and the amount of residual magnetization can be controlled by changing the amount of oxygen introduced during deposition.

In addition, a foundation layer or a primer layer of a predetermined material, for example, may be interposed between the non-magnetic substrate 61 and the metal magnetic thin film 62. CrTi, CrMo, CrV, etc. may be used for the foundation layer in addition to Cr. Water soluble latex, whose main component is acrylic ester, may be used, for example, for the primer layer.

Next, properties of the magnetic recording medium 2 will be described.

In one embodiment of the magnetic recording medium 2 of the present invention, the value of Mr·t, i.e. the product of residual magnetization Mr and film thickness t, is within a range of 4 mA to 20 mA.

This is because when the value of Mr·t of the magnetic recording medium 2 is greater than 20 mA, the GMR head saturates, the MR ratio falls outside of the linear range, and the reproduced waveform is distorted.

In addition, when the value of Mr·t is smaller than 4 mA, the reproduced output decreases, and a satisfactory S/N ratio (signal/noise ratio) cannot be attained.

Therefore, by limiting the value of Mr·t to the range of 4 mA to 20 mA, distortion in the reproduced waveform may be eliminated, and high reproduced output and a satisfactory S/N ratio may be obtained. It is further preferable that Mr·t be 6 mA to 20 mA, and it is still further preferable that Mr·t be 6 mA to 17 mA.

The values of Mr and t can be controlled by adjusting such conditions as the amount of oxygen introduced during vacuum deposition and the feeding speed of the non-magnetic substrate 62. In other words, if the amount of oxygen introduced during vacuum deposition is decreased, the value of Mr increases. If the amount of oxygen introduced is increased, the value of Mr decreases.

If the feeding speed of the non-magnetic substrate 61 during vacuum deposition is slowed down, the value of t increases. If the feeding speed is increased, the value of t decreases. Also, the value of Mr can be adjusted through a surface oxidizing treatment after the formation of the metal magnetic thin film 62.

In this case, it is preferable that the value of Mr, i.e. the residual magnetization, be within a range of 160 kA/m to 400 kA/m. If the value of Mr is greater than 400 kA/m, magnetic particles cannot be separated from one another, and noise increases due to magnetic interaction between the particles. On the other hand, if the value of Mr is smaller than 160 kA/m, oxidation of Co particles occurs, and sufficient reproduced output cannot be attained.

Therefore, by adjusting the value of Mr to be within the range of 160 kA/m to 400 kA/m, it is possible to decrease noise and to provide sufficient reproduced output. More preferably, the value of Mr should be within a range of 200 kA/m to 360 kA/m.

The thickness t of the metal magnetic thin film 62 is controlled so that the product Mr·t of residual magnetization Mr and thickness t falls within the numerical range mentioned above.

Thickness t of the metal magnetic thin film 62 should preferably be 15 nm to 100 nm. It is further preferable that it be 20 nm to 75 nm, and it is still further preferable that it be 20 nm to 50 nm.

In another embodiment of the present invention, it is preferable that the surface resistivity of the metal magnetic thin film 62 of the magnetic recording medium 2 be within the range $1 \times 10^3$ Ω/sq. to $1 \times 10^9$ Ω/sq. It is further preferable that it be $1 \times 10^4$ Ω/sq. to $1 \times 10^9$ Ω/sq.

The method of measuring surface resistivity will be described below. As a sample for measuring surface resistivity, a magnetic tape slit into a width of 8 mm is used. This magnetic tape is cast between electrodes spaced apart by an inch (25.4 mm), and a weight of approximately 40 g is attached to each end of the magnetic tape. Under this condition, resistance R between the electrodes is measured. The surface resistivity of the magnetic tape is calculated by the expression R×8/25.4 [Ω/sq.]. As used herein, the term surface resistivity refers to the electrical resistance per unit area.

It was found that when the surface resistivity is lower than $1\times10^3$ Ω/sq., the electric charge built up in the magnetic recording medium 2 flows rapidly to the GMR head, and electrostatic discharge (ESD) may occur. On the other hand, it was found that when the surface resistivity is greater than $1\times10^9$ Ω/sq., electric charge is more readily built up in the magnetic recording medium 2, and electrostatic discharge (ESD) occurs in the GMR head.

Therefore, it is preferable that the surface resistivity of the metal magnetic thin film 62 be $1\times10^3$ Ω/sq. to $1\times10^9$ Ω/sq. Further, by adjusting it to fall between $1\times10^4$ Ω/sq. to $1\times10^9$ Ω/sq., electrostatic in the GM head can be prevented reliably.

The surface resistivity of the magnetic recording medium 2 can be controlled by adjusting the amount of oxygen introduced during vacuum deposition, or the feeding speed of the non-magnetic substrate 61. In addition, it may also be controlled by adding a process of surface oxidization as needed.

In addition, the surface resistivity of the magnetic recording medium 2 can be adjusted by controlling the thickness of the diamond-like carbon (DLC) protective layer on the metal magnetic thin film 62. Further, it may also be controlled by interposing a foundation layer or a primer layer between the non-magnetic substrate 61 and the metal magnetic thin film 62.

In another embodiment of the present invention, the arithmetical mean roughness Ra of the side of the magnetic recording medium 2 on which the metal magnetic thin film 62 is formed is 1 nm to 5 nm, and the ten-point mean roughness Rz is 20 nm to 200 nm.

As set forth in the JIS roughness standard (JIS B0601-1994), Ra is the mean value of absolute deviation from the mean, and Rz is the mean height of the five highest peaks and the five lowest valleys per standard length.

Here, surface roughness Ra and Rz were measured using AFM on an area of 50 µm by 50 µm.

When Ra is less than 1 nm, or when Rz is less than 20 nm, the magnetic recording medium 2 can stick to the rotary drum 9 or the guide rollers 5 when the tape is run, and the running of the magnetic tape is affected. On the other hand, when Ra is greater than 5 nm, or when Rz is greater than 200 nm, the magnetoresistive heads 12 wear due to physical contact, and, in addition, because the spacing between the magnetic recording medium 2 and the magnetoresistive heads 12 becomes larger, it causes a degradation in output.

In addition, it is preferable that the in-plane coercivity Hc of the magnetic recording medium (magnetic tape) 2 be 100 kA/m to 160 kA/m.

This is because when the coercivity Hc is les than 100 kA/m, noise cannot be reduced, and a high S/N ratio cannot be achieved. On the other hand, when the coercivity Hc exceeds 160 kA/m, satisfactory recording cannot be performed, and reproduced output decreases.

Therefore, by restricting the in-plane coercivity to the range 100 kA/m to 160 kA/m, noise can be lowered, and a high S/N ratio can be achieved, while high reproduced output is obtained.

The protective layer 63 may be any of the protective films used for conventional magnetic tapes. For example, diamond-like carbon (DLC), $CrO_2$, $Al_2O_3$, BN, Co oxides, MgO, $SiO_2$, $Si_3O_4$, SiNx, SiC, $SiNx.SiO_2$, $ZrO_2$, $TiO_2$, TiC, etc. may be used. The protective film may be a single layer film consisting of these materials or it may be a multi-layer film or a composite film.

The configuration of the magnetic recording medium 2 is not limited to the configuration shown in FIG. 23. Layers of various materials may be interposed as needed, or a top coat layer comprised of a lubricant or an anti-rust agent may be formed on the metal magnetic thin film 62 or the protective layer 63.

Further, a plurality of metal magnetic thin films may be layered. Also, the magnetic recording medium 2 may have vertical anisotropy or a random in-plane orientation.

As described above, according to a magnetic recording/reproducing apparatus related to the present invention, by numerically restricting the corrosion potential of the spin-valve film of the magnetoresistive head, even in a case where a protective layer is not formed on the surface that contacts a magnetic recording medium, superior corrosion resistance and durability may be achieved.

In addition, with respect to a magnetic recording medium to be used with a magnetic recording/reproducing apparatus related to the present invention, by defining optimum numerical ranges for the product of the residual magnetization of the magnetic metal thin film and its thickness, as well as for the residual magnetization, noise was reduced, head saturation was effectively prevented, distortion in the reproduced waveform was eliminated, and a higher S/N ratio was achieved.

In addition, with respect to a magnetic recording medium to be used with a magnetic recording/reproducing apparatus related to the present invention, by defining an optimum numerical range for the surface resistivity of the metal magnetic thin film, noise was reduced, distortion in the reproduced waveform was eliminated, and a higher S/N ratio was achieved.

In addition, with respect to a magnetic recording medium to be used with a magnetic recording/reproducing apparatus related to the present invention, by defining optimum numerical ranges for Ra and Rz of the side on which the metal magnetic thin film is formed, wear of the magnetoresistive heads was suppressed, and noise was reduced.

EXAMPLES

Next, a magnetic recording/reproducing apparatus related to the present invention will be described through specific examples. In the examples given below, specific materials and numerical values are given, but it should be obvious that the present invention is not limited to these materials or numerical values.

Experiment A

Example A1

A magnetic tape was prepared as follows.

A polyethylene terephthalate film of a thickness of 10 µm and a width of 150 mm was prepared as a non-magnetic substrate. On the surface of this film, water-soluble latex containing acrylic ester as its main component was applied to form a primer layer so that the density of fine dents and bumps would be 10,000,000/mm².

Then, a Co—O type metal magnetic thin film of a thickness of 40 nm was formed by vacuum deposition. Film-forming conditions were as follows:

(Film-Forming Conditions)
  Degree of vacuum during vacuum deposition: $7\times10^{-2}$ Pa
  Ingot: Co
  Incident angle: 45° to 90°
  Gas fed: Oxygen gas After the metal magnetic thin film was formed, a protective layer comprised of a carbon film of a thickness of about 10 nm was formed through sputtering or CVD. Then, on the surface of the non-magnetic substrate opposite the surface on which the metal magnetic thin film was formed, a back coat layer comprised of carbon and urethane resin was formed in a thickness of 0.6 μm. In addition, a lubricant comprised of perfluoro-polyether was applied onto the protective layer mentioned above.

Then, the product thus obtained was cut into widths of 8 mm. The surface of the metal magnetic thin film was oxidized by leaving it in the atmosphere over a predetermined period under room temperature and a sample magnetic tape was thus prepared.

In the magnetic tape thus prepared, the residual magnetization (Mr) was 325 mA/m. The thickness (t) of the metal magnetic thin film was 40 nm. The product thereof (Mr·t) was 13 mA.

Examples A2 to A6, Comparative Examples A1 and A2

Residual magnetization (Mr) was controlled by adjusting the amount of introduced oxygen during vacuum deposition of the metal magnetic thin film and by adjusting the period of time over which the magnetic tape was left in the atmosphere after the formation of the metal magnetic thin film, thereby varying the product (Mr·t) as shown in Table 1.

As for the other conditions, the sample magnetic tapes in these examples were obtained in a similar manner as example A1 above.

Measurements of electromagnetic conversion characteristics were taken with respect to the sample magnetic tapes thus prepared in examples A1 through A6 and comparative examples A1 and A2.

More specifically, a modified 8-mm VTR was used. Information signals were recorded on each of the sample tapes at a recording wavelength of 0.4 μm. Then, reproduced output, noise level, and S/N ratio were measured using the shield type GMR head 20.

The various conditions for preparing the sample magnetic tapes of examples A1 through A6 and comparative examples A1 and A2, as well as their reproduced output, noise level and S/N ratio are shown in table 1 below.

TABLE 1

| | Mr·t [mA] | Reproduced Output [dB] | Noise [dB] | C/N |
|---|---|---|---|---|
| Example A1 | 13 | 8.5 | 6.5 | +2.0 |
| Example A2 | 10 | 6.9 | 4.8 | +2.1 |
| Example A3 | 6 | 2.3 | 1.1 | +1.2 |
| Example A4 | 4 | 0.0 | 0.0 | 0.0 |
| Example A5 | 20 | 11.2 | 10.9 | +0.3 |
| Example A6 | 17 | 9.5 | 8.1 | +1.4 |
| Comparative Example A1 | 3 | −3.9 | −1.7 | −2.2 |
| Comparative Example A2 | 22 | 12.0 (Distortion) | 13.9 | −1.9 |

As shown in Table 1 above, in examples A1 through A6 in which the product Mr·t of residual magnetization Mr and thickness t of the metal magnetic thin film was so controlled as to be 4 mA to 20 mA, high reproduced output free of distortion was obtained, and favorable S/N ratios were obtained.

On the other hand, in comparative example A1 where the product Mr·t was less than 4 mA, reproduced output was smaller, and a favorable S/N ratio could not be obtained.

In addition, in comparative example A2 in which Mr·t was greater than 20 mA, the GMR head saturated, and distortion occurred in the reproduced output.

Examples A7 through A10, Comparative Examples A3 and A4

Next, the residual magnetization Mr of the metal magnetic thin film was varied, and sample magnetic tapes were prepared. The reproduced output, noise level and S/N ratio of the samples were measured and evaluated.

In these examples, by adjusting the period of time over which the magnetic tape was left in the atmosphere after the formation of the metal magnetic thin film, residual magnetization Mr was controlled as shown in table 2 below so that the product Mr·t of the residual magnetization Mr and the thickness t of the metal magnetic thin film would be constant at 3 mA. As for the other conditions, the sample magnetic tapes in these examples were obtained in a similar manner as example A1 above.

Measurements of residual magnetization Mr, reproduced output, noise level and S/N ratio of the sample magnetic tapes thus prepared in examples A7 through A10 and comparative examples A3 and A4 are shown in table 2 below.

TABLE 2

| | Mr [kA/m] | Reproduced Output [dB] | Noise [dB] | C/N |
|---|---|---|---|---|
| Example A7 | 200 | 0.0 | 0.0 | 0.0 |
| Example A8 | 160 | −0.5 | +0.3 | −0.8 |
| Example A9 | 400 | −0.1 | +0.8 | −0.9 |
| Example A10 | 360 | 0.1 | +0.2 | −0.1 |
| Comparative Example A3 | 140 | −1.6 | +0.5 | −2.1 |
| Comparative Example A4 | 420 | −0.2 | +1.7 | −1.9 |

As shown in Table 2 above, in examples A7 through A10 in which the residual magnetization Mr of the metal magnetic thin film is 160 to 400 kA/m, noise was reduced, high reproduced output was obtained, and favorable S/N ratios were obtained. In particular, when Mr was between 200 and 360 kA/m, favorable magnetic properties were obtained.

On the other hand, in comparative example A3 where residual magnetization Mr was less than 160 kA/m, sufficient reproduced output could not be obtained.

In addition, in comparative example A4 where residual magnetization Mr was greater than 400 kA/m, noise increased, and a favorable S/N ratio could not be obtained.

Experiment B

Example B1

A magnetic tape was prepared as follows.

A polyethylene terephthalate film of a thickness of 10 μm and a width of 150 mm was prepared as a non-magnetic substrate. On the surface of this film, water-soluble latex containing acrylic ester as its main component was applied to form a primer layer so that the density of fine dents and bumps would be 10,000,000/mm$^2$.

Then, a Co—O type metal magnetic thin film of a thickness of 40 nm was formed by vacuum deposition. Film-forming conditions were as follows:

(Film-Forming Conditions)

Degree of vacuum during vacuum deposition: $7\times10^{-2}$ Pa
Ingot: Co
Incident angle: 45° to 90°
Gas fed: Oxygen gas After the metal magnetic thin film was formed, a protective layer comprised of a carbon film of a thickness of about 10 nm was formed through sputtering or CVD. Then, on the surface of the non-magnetic substrate opposite the surface on which the metal magnetic thin film was formed, a back coat layer comprised of carbon and urethane resin was formed in a thickness of 0.6 µm. In addition, a lubricant comprised of perfluoro-polyether was applied onto the protective layer mentioned above.

Then, the product thus obtained was cut into widths of 8 mm. The surface of the metal magnetic thin film was oxidized by leaving it in the atmosphere over a predetermined period under room temperature and a sample magnetic tape was thus prepared.

The surface resistivity of the magnetic tape thus prepared was $5\times10^5$ Ω/sq.

Examples B2 to B5, Comparative Examples B1 and B2

By controlling the amount of oxygen introduced during vacuum deposition of the metal magnetic thin film, and the period of time over which the magnetic tape was left in the atmosphere after the formation of the metal magnetic thin film, the surface resistivity was controlled as shown in table 3 below.

As for the other conditions, the sample magnetic tapes in these examples were obtained in a similar manner as example B1 above.

Measurements of surface resistivity were taken and evaluations of electrostatic discharge when a GMR head is used were made with respect to the sample magnetic tapes thus prepared in examples B1 through B5 and comparative examples B1 and B2.

For the evaluation of electrostatic discharge, a modified 8-mm VTR was used. Each magnetic tape sample was run, and cases where the magnetoresistive properties of the GMR head 20 did not change at all and no electrostatic discharge occurred were designated with a O, cases where the magnetoresistive properties of the GMR head changed slightly, but no electrostatic discharge occurred were designated with a Δ, and cases where electrostatic discharge did occur were designated with a x.

The surface resistivity and the evaluation results of electrostatic discharge in the GMR head are shown for the magnetic tapes of examples B1 through B5 and comparative examples B1 and B2 in table 3 below.

TABLE 3

|  | Surface Resistivity [Ω/sq.] | ESD Evaluation |
| --- | --- | --- |
| Example B1 | $5\times10^5$ | ○ |
| Example B2 | $1\times10^3$ | Δ |
| Example B3 | $3\times10^7$ | ○ |
| Example B4 | $9\times10^8$ | ○ |
| Example B5 | $2\times10^4$ | ○ |
| Comparative Example B1 | $9\times10^2$ | x |
| Comparative Example B2 | $3\times10^9$ | x |

As shown in Table 3 above, in examples B1 through B5 in which the surface resistivity of the metal magnetic thin film is $1\times10^3$ Ω/sq. to $1\times10^9$ Ω/sq., no electrostatic discharge occurred in the GMR head, and a more reliable magnetic recording/reproducing apparatus could be realized.

When example B2 and example B5 were compared, it was found that, by restricting the range of surface resistivity of the metal magnetic thin film to $1\times10^4$ Ω/sq. to $1\times10^9$ Ω/sq., changes in magnetoresistive properties were more effectively suppressed, occurrences of electrostatic discharge were prevented, and a more reliable magnetic recording/reproducing apparatus could be obtained.

On the other hand, in comparative example B1 where the surface resistivity of the metal magnetic thin film of the magnetic tape was made smaller than $1\times10^3$ Ω/sq., electrostatic discharge occurred in the GMR head. In addition, in comparative example B2, too, where the surface resistivity of the metal magnetic thin film was made greater than $1\times10^9$ Ω/sq., electrostatic discharge occurred in the GMR head.

Experiment C

Example C1

A magnetic tape was prepared as follows.

A polyethylene terephthalate film of a thickness of 10 µm and a width of 150 mm was prepared as a non-magnetic substrate. On the surface of this film, water-soluble latex containing acrylic ester as its main component was applied to form a primer layer so that the density of fine dents and bumps would be 10,000,000/mm².

Then, a Co—O type metal magnetic thin film of a thickness of 40 nm was formed by vacuum deposition. Film-forming conditions were as follows:

(Film-forming Conditions)

Degree of vacuum during vacuum deposition: $7\times10^{-2}$ Pa
Ingot: Co
Incident angle: 45° to 90°
Gas fed: Oxygen gas After the metal magnetic thin film was formed, a protective layer comprised of a carbon film of a thickness of about 10 nm was formed through sputtering or CVD. Then, on the surface of the non-magnetic substrate opposite the surface on which the metal magnetic thin film was formed, a back coat layer comprised of carbon and urethane resin was formed in a thickness of 0.6 µm. In addition, a lubricant comprised of perfluoro-polyether was applied onto the protective layer mentioned above.

Then, the product thus obtained was cut into widths of 8 mm. The surface of the metal magnetic thin film was oxidized by leaving it in the atmosphere over a predetermined period under room temperature and a sample magnetic tape was thus prepared.

In the magnetic tape thus prepared, Ra was 3.0 nm, and Rz was 50 nm.

In addition, residual magnetization Mr was 325 kA/m, and the thickness t of the metal magnetic thin film was 40 nm, and the product Mr·t thereof was 13 mA.

Examples C2 to C6, Comparative Examples C1 and C4

By controlling the height of protrusions and surface roughness of the non-magnetic substrate 61 in preparing the magnetic recording medium 2, and by providing a foundation layer or primer layer between the non-magnetic substrate 61 and the metal magnetic thin film 62, magnetic tapes having the surface roughness Ra and Rz shown in table 4 were prepared.

With respect to the magnetic tapes thus prepared in examples C1 through C6 and comparative examples C1 through C4, their electromagnetic conversion characteristics were measured.

More specifically, a modified 8-mm VTR was used. Head wear was measured from the change in resistance of the shield type GMR head 20 after each sample magnetic tape was run. The results of head wear evaluations and of running performance evaluations of the magnetic tapes are shown in table 4 below.

With respect to head wear, cases where almost no wear was confirmed are designated with a O, cases where the amount of head wear was 3% or below are designated with a Δ, cases where the amount of head wear was 10% or greater are designated with a x, and cases where measurements could not be made because the magnetic tape could not be run are indicated with a –.

In addition, as for the running performance of the magnetic tapes, those that run well are designated with a Δ, and those that stuck and did not run well are designated with a x.

TABLE 4

|  | Ra [nm] | Rz [nm] | Magnetic Head Wear | Tape Running Performance |
|---|---|---|---|---|
| Example C1 | 1.0 | 20 | ○ | Δ |
| Example C2 | 2.1 | 40 | ○ | Δ |
| Example C3 | 3.0 | 55 | ○ | Δ |
| Example C4 | 3.5 | 90 | ○ | Δ |
| Example C5 | 5.0 | 150 | ○ | Δ |
| Example C6 | 5.0 | 200 | Δ | Δ |
| Comparative Example C1 | 0.8 | 23 | — | x (sticking) |
| Comparative Example C2 | 1.0 | 17 | — | x (sticking) |
| Comparative Example C3 | 5.5 | 190 | x | Δ |
| Comparative Example C4 | 5.0 | 230 | x | Δ |

As shown in Table 4 above, in examples C1 through C6 in which Ra of the metal magnetic thin film was made to be 1 to 5 nm, and Rz was made to be 20 to 200 nm, the magnetoresistive head did not wear, durability was superior and running performance was also favorable.

On the other hand, in comparative example C1 where Ra of the metal magnetic thin film was made to be smaller than 1 nm, as well as in comparative example C2 where Rz of the metal magnetic thin film was made to be smaller than 20 nm, sticking occurred while being run.

In addition, in comparative example C3 where Ra of the metal magnetic thin film was made to be greater than 5 nm, as well as in comparative example C4 where Rz of the metal magnetic thin film was made to be greater than 20 nm, the magnetoresistive head wore more, the resistance of the magnetoresistive head increased, and output became unstable.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A magnetic recording/reproducing apparatus, comprising:
 a magnetoresistive head including a spin-valve film as a magnetic sensor element for detecting magnetic signals, said spin-valve film having a structure in which an anti-ferromagnetic layer, a pinned layer in which the direction of magnetization is pinned in a predetermined direction by an exchange-coupling magnetic field at work between itself and said anti-ferromagnetic layer, a free layer in which the direction of magnetization changes in accordance with an external magnetic field, and a non-magnetic layer for magnetically isolating said pinned layer and said free layer are layered, wherein
 magnetic signals are detected from a magnetic recording medium, which includes a tape-shaped non-magnetic substrate and a metal magnetic thin film formed thereon, while in sliding contact,
 said spin-valve film has a corrosion potential relative to a standard hydrogen electrode of +0.4. [V vs. SHE] or greater when immersed in a NaCl solution of a concentration of 0.1 mol/L,
 a product Mr·t of residual magnetization Mr and thickness t of said metal magnetic thin film is 4 mA to 20 mA, and said residual magnetization Mr is 160 kA/m to 400 kA/m.

2. The magnetic recording/reproducing apparatus according to claim 1, wherein with respect to said non-magnetic layer of said spin-valve film, the corrosion potential relative to a standard hydrogen electrode measured while immersed in a NaCl solution of a concentration of 0.1 mol/L is +0.4 [V vs. SHE] or greater.

3. The magnetic recording/reproducing apparatus according to claim 1, wherein
 said non-magnetic layer comprises one of an Au alloy or a Cu alloy, and
 said pinned layer and said free layer comprise one of NiFe and CoNiFe, and assuming the composition ratio of Co:Ni:Fe is b:c:d (where b, c and d represent atomic percentages), respectively, the composition ranges thereof are $0 \leq b \leq 75$, $15 \leq c \leq 95$ and $5 \leq d \leq 40$ (where b+c+d=100 atomic %).

4. The magnetic recording/reproducing apparatus according to claim 1, wherein said magnetoresistive head is mounted on a rotary drum and detects magnetic signals by a helical scan method while in contact with a tape-shaped magnetic recording medium.

5. The magnetic recording/reproducing apparatus according to claim 1, wherein said metal magnetic thin film of said magnetic recording medium has a surface resistivity of $1 \times 10^5$ Ω/sq. to $1 \times 10^9$ Ω/sq.

6. The magnetic recording/reproducing apparatus according to claim 5, wherein the surface resistivity of said metal magnetic thin film is $1 \times 10^4$ Ω/sq. to $1 \times 10^9$ Ω/sq.

7. The magnetic recording/reproducing apparatus according to claim 5, wherein said magnetoresistive head is mounted on a rotary drum and detects magnetic signals by a helical scan method while in contact with a tape-shaped magnetic recording medium.

8. The magnetic recording/reproducing apparatus according to claim 1, wherein a surface of said metal magnetic thin film of said magnetic recording medium has an arithmetic mean roughness Ra of 1 nm to 5 nm and a ten-point mean roughness Rz of 20 nm to 200 nm.

9. The magnetic recording/reproducing apparatus according to claim 8, wherein said magnetoresistive head is mounted on a rotary drum and detects magnetic signals by a helical scan method while in contact with a tape-shaped magnetic recording medium.

* * * * *